(12) United States Patent
Jackson, Sr.

(10) Patent No.: US 9,889,824 B2
(45) Date of Patent: Feb. 13, 2018

(54) ELECTRONIC INTERFACE CONTROL SYSTEM FOR A PNEUMATIC VEHICLE SAFETY LIFT SYSTEM

(71) Applicant: Clinton L. Jackson, Sr., St. Charles, MO (US)

(72) Inventor: Clinton L. Jackson, Sr., St. Charles, MO (US)

( * ) Notice: Subject to any disclaimer, the term of this patent is extended or adjusted under 35 U.S.C. 154(b) by 0 days.

(21) Appl. No.: 15/348,719

(22) Filed: Nov. 10, 2016

(65) Prior Publication Data

US 2017/0057472 A1 Mar. 2, 2017

Related U.S. Application Data

(63) Continuation-in-part of application No. 14/483,143, filed on Sep. 10, 2014, now abandoned.

(60) Provisional application No. 61/960,104, filed on Sep. 10, 2013.

(51) Int. Cl.
  *B60S 9/12* (2006.01)
(52) U.S. Cl.
  CPC ..................... *B60S 9/12* (2013.01)
(58) Field of Classification Search
  CPC .............................................. B60S 9/12
  See application file for complete search history.

(56) References Cited

U.S. PATENT DOCUMENTS

| | | | | |
|---|---|---|---|---|
| 5,931,500 A * | 8/1999 | Dagnese | ................... | B60S 9/12 254/423 |
| 6,079,742 A * | 6/2000 | Spence | ................ | B25B 21/002 254/423 |
| 6,527,254 B1 * | 3/2003 | Prevete | .................... | B60S 9/12 254/418 |
| 6,832,402 B1 | 12/2004 | Drago | | |
| 6,895,648 B1 * | 5/2005 | Willett | ...................... | B60S 9/12 254/423 |
| 7,004,457 B2 | 2/2006 | Jackson | | |
| 7,334,777 B2 | 2/2008 | Jackson | | |
| 8,112,837 B1 * | 2/2012 | Lopez | ................... | B25H 3/006 254/126 |
| 8,678,471 B2 * | 3/2014 | McCarthy | ................ | B60P 3/32 296/156 |
| 9,056,755 B1 * | 6/2015 | Moy | ........................ | B66F 3/24 |
| 9,248,778 B2 * | 2/2016 | Ford | ................... | B60Q 1/2611 |
| 2002/0008231 A1 * | 1/2002 | Glovatsky | ................ | B60S 9/04 254/418 |

(Continued)

*Primary Examiner* — Rodney Butler
(74) *Attorney, Agent, or Firm* — Charles McCloskey

(57) ABSTRACT

An electronic interface control system for a pneumatic vehicle safety lift system has a computer that receives sensor inputs, presents outputs, and receives commands from a user. The computer has its power from an automobile and operates an air compressor for air hoses. The computer operates a pneumatic jack upon an automobile. The computer reads sensors related to jack position and triggers indicators to the user so the jack raises the vehicle after a footplate rests below it in a safe manner. The system lifts a vehicle stuck or undergoing repair. The computer checks that a certain number of jacks, preferably one, activate at once. The computer checks by inquiring of the sensors and switches deployed upon a vehicle and within a carrying case. The carrying case has a safety strut for the jack and a torque gun for a user.

3 Claims, 20 Drawing Sheets

(56) References Cited

U.S. PATENT DOCUMENTS

| | | | |
|---|---|---|---|
| 2002/0100901 A1* | 8/2002 | Topelberg | B60S 9/12 254/423 |
| 2004/0125609 A1* | 7/2004 | Gilligan | B25B 21/00 362/486 |
| 2004/0155231 A1* | 8/2004 | Tsatsis | B60S 9/12 254/423 |
| 2005/0111995 A1* | 5/2005 | Everson | B25F 5/00 417/313 |
| 2005/0127343 A1* | 6/2005 | Jackson, Sr. | B60S 9/12 254/423 |

* cited by examiner

ELECTRONIC INTERFACE CONTROL SYSTEM FOR A PNEUMATIC VEHICLE SAFETY LIFT SYSTEM

CROSS-REFERENCE TO RELATED APPLICATION

This nonprovisional application claims priority to pending non-provisional application Ser. No. 14/483,143 with a filing date of Sep. 10, 2014 which claims priority to provisional application No. 61/960,104 with a filing date of Sep. 10, 2013 and all are owned by the same inventor.

BACKGROUND OF THE INVENTION

The electronic interface control system for a pneumatic vehicle safety lift system generally relates to lifting equipment and more specifically to coordinated jacks mounted upon an automotive vehicle.

For centuries, people walked from place to place usually with shoes. If a shoe had a problem, a person repaired the shoe or bought a new pair of shoes. People then domesticated horses and rode them from place to place. If a horse lost a horseshoe or became lame, people tended to the horse. In the last century, people developed automobiles and light trucks of wide description. People drove them from place to place. Automobiles opened large swaths of the country to development and expanded employment opportunities for many. From time to time, an automobile becomes stuck in mud, in snow, or on a hump, or has a breakdown of various forms. Automobile manufacturers include a manually operated jack with each new vehicle and after market jacks remain prevalent at auto part stores across the country. In time though, an automobile operator may lose a jack for a vehicle or the motivation or ability to operate a manual jack. Manual jacks also have other power sources such as lever actuated hydraulic jacks, like floor jacks and bottle jacks. These jacks generally rest upon a floor or other supporting surface and extend upwardly to lift a portion of an automobile. As the jack separates from an automobile outside of its usage, the jack can be misplaced.

DESCRIPTION OF THE PRIOR ART

Various pieces of equipment have utilized jacks differently. This equipment mounts a jack into the equipment for various purposes. Fire trucks have ladder truck versions and preparing to extend the ladder, the truck extends outriggers. The outriggers have hydraulic actuators that extend feet outwardly from the truck chassis and expand the footprint of the truck. The outriggers reduce the risk of the truck toppling as the fireman climbs and descends the ladder. The actuator often has one mount upon or near the chassis of the truck and a second mount to the outrigger that moves with the outrigger.

A trained fireman operates the ladder truck and the outriggers for safe and prompt raising of the ladder in the hurried circumstances of a fire or rescue. The fireman reads various levels and gauges upon the truck's control panel so that the truck remains level and avoids overturning. Select trucks may provide an auto leveling capability to the fireman operator.

Truck cranes travel from jobsite to jobsite to lift and move objects of all description. Such cranes have a boom that elevates and extends from a rotating cab. As the boom moves and engages its load, the crane has a risk of toppling over. Truck cranes also have outriggers that typically extend laterally from the chassis and then drop feet vertically upon wooden pads. The outriggers have heavy steel construction as they support large moments and shear loads as they prevent toppling. The outriggers often operate hydraulically and the feet descend hydraulically or from mechanical threading. The outriggers often have a beam extending from the chassis and a depending foot spaced outwardly and away from the chassis during usage. In select situations, the outriggers may lift a chassis above the ground or supporting surface.

Select muscle cars also utilize jacks for various lifting maneuvers, often called lift kits. The lift kits elevate the body of a car from the chassis for various stunts and effects. The lift kit may keep the body stationary or oscillate the body up and down on its own right or to music. The lift kits utilize jacks, or hydraulic cylinders, mounted to the chassis and the jack piston attached to the body. Activating the jack, extends the piston to lift the body away from the chassis and the wheels remain on the road, ground, or other supporting surface.

The prior art vehicle lift systems often utilize pneumatic, hydraulic, and electric power from fixed facilities, such as garages. The prior art lift systems provide outriggers that stabilize a vehicle or equipment against toppling or lift kits that lift a body relative to the chassis. The prior art lift systems do not provide the ergonomic consideration and clear operator interface communication by use of indicators, on board vehicle systems and electronic controls as in the present invention.

SUMMARY OF THE INVENTION

The electronic interface control system for a pneumatic vehicle safety lift system has a computer with a microprocessor that receives sensor inputs, indicators or switches, presents various outputs such as lights, LED, or audible sounds, and receives commands from a user. The computer receives electrical power from an automotive vehicle and directs operation of an air compressor that pressurizes a system of hoses. The computer in cooperation with the air hoses operates at least one jack mounted upon an automotive vehicle. The computer reads various sensors related to jack position and triggers various indicators to the user so that the at least one jack raises the vehicle after a footplate has contacted the ground or supporting surface in the safest of manners. The invention has the computer check that a certain number of jacks, preferably one may activate at one time. The computer operates that check upon a method of inquiring the status of sensors deployed upon a vehicle and within a carrying case. The carrying case includes a safety strut deployed upon a jack and a torque wrench that a user utilizes in a certain sequence.

There has thus been outlined, rather broadly, the more important features of the invention in order that the detailed description thereof that follows may be better understood and that the present contribution to the art may be better appreciated. The present invention also includes an air actuated torque wrench, additional safety struts, Wi-Fi connectivity between the carrying case and the computer, a housing that encloses the computer, one jack installed per wheel well of a vehicle, and alternate power sources for the computer and the jacks. Additional features of the invention will be described hereinafter and which will form the subject matter of the claims attached.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is to provide an electronic interface control system for a pneumatic vehicle safety lift system that utilizes light emitting diodes or LEDs, indicators, and an audible vehicle cabin alert to clearly communicate the operational status of the invention.

Another object is to provide such an electronic control electronic interface control system for a pneumatic vehicle safety lift system that improves safety when a vehicle is lifted by the present invention.

Another object is to provide such an electronic interface control system for a pneumatic vehicle safety lift system that integrates into a vehicle, such as an automobile, for safe and convenient lifting of the vehicle when aground or stuck, for repairs, for changing a tire, and the like.

Another object is to provide such an electronic interface control system for a pneumatic vehicle safety lift system made and distributed at a price suitable for purchase through retail stores, distributors, catalog supply houses, websites, and the like.

Another object is to provide such an electronic interface control system for a pneumatic vehicle safety lift system that utilizes ergonomic consideration, clear operator interface communication through indicators, and effective switching controls.

Another object is to provide such an electronic interface control system for a pneumatic vehicle safety lift system that has a cost effective design and cost effective operation over the life cycle of the invention.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In referring to the drawings,

FIG. 6l provides a portion of a detailed flow chart of a process loop, showing match point R;

The same reference numerals refer to the same parts throughout the various figures.

DESCRIPTION OF THE PREFERRED EMBODIMENT

Figure 1:
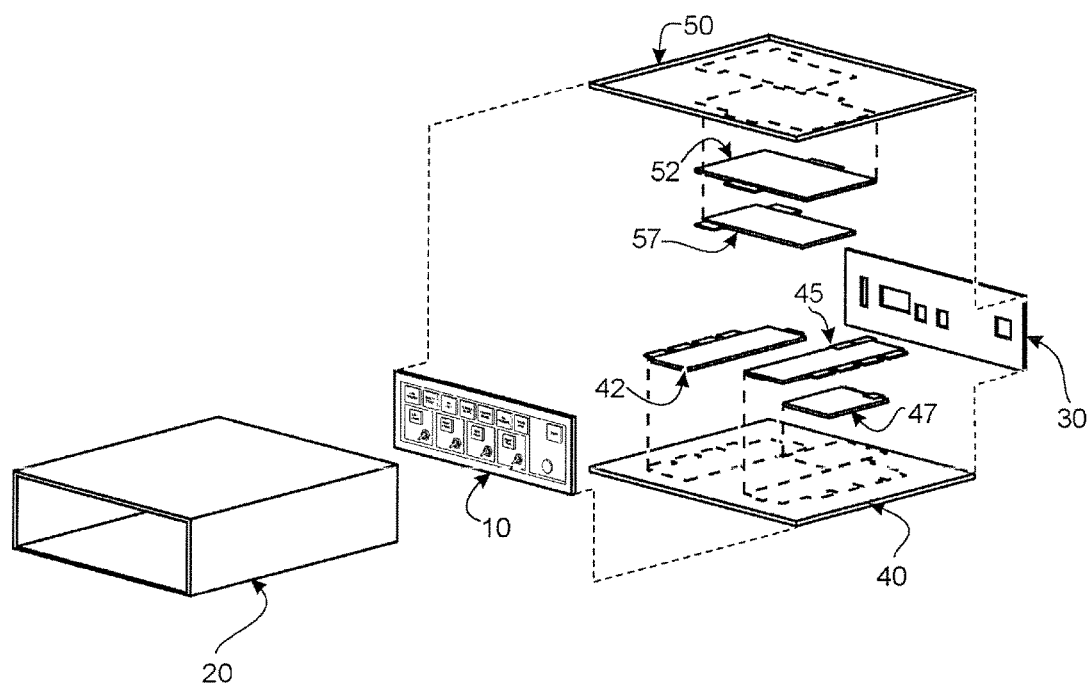
FIG. 1 provides an exploded view of the invention.

The present art overcomes the prior art limitations by providing an electronic interface control system for a pneumatic vehicle safety lift system. With reference to the drawings, FIG. 1 shows a detailed exploded view of the invention with an enclosure that houses hardware and other components, as at a housing 20. The enclosure has its construction of metals, polymers, and the like. The housing 20 has a rectangular, hollow, prismatic form. The present invention of the electronic interface control system for a pneumatic vehicle safety lift system provides electronic hardware components as at 42, 45, 47, 52, 57 generally viewed as the computer, or even brain. The components include an input board 42 that collects and reads inputs, and an output board 45 that provides operating outputs based on a program control board 47. The program control board 47 has a sequence of operation of a control for a general purpose of the board 47 of a known type so that the board 47 executes formulas in an object program as later described in FIG. 6. The control board also includes a microprocessor that receives sensor inputs, presents various outputs, and receives commands from a user. The computer receives power from an automotive vehicle, and more particularly from a voltage converter board as later described. The object program includes a plurality of formulas, such that the same results will be produced when using the same data, regardless of the sequence in which said formulas are presented in the object program.

The object program includes a sequence of commands. The commands cover three areas. First, the commands examine each of the formulas in a storage area of the program control board 47 to determine which formulas can be designated as defined. Second, the commands store each formula in the sequence in which each formula is designated as defined. Third, the commands then repeat the sequence of commands for at least the undefined formulas as many times as required until all of the formulas have been designated as defined and entered storage as in the second area. The commands over the three areas thereby produce the same results upon sequential execution of the formulas stored by the sequence of operation of the control board 47 when using the same given data, regardless of the order in which the formulas were presented in the object program before the sequence of operation of the control board 47.

Turning to the driver board 57, it delivers power to drive the components of the system of the present invention. The driver board 57 also includes a converter board 52 that converts a 12V DC power source to a 5V DC ready output back to the driver board. The program control board 47 also provides the logical results required in reaction to the input states read from a vehicle that has an invention installed upon it.

The program control board 47 also has dynamic memory stored upon it that holds various data. The data includes the results of intermediate decisions based upon operating rules, parameters in static memory, and operating programming for when no power flows into the invention and for restoring the system of the invention before its installation.

The present invention also has an electronic interface control panel 10 with indicators upon it. The indicators include, as a later shown, a lug wrench indicator 22, safety strut indicator 24, excessive tilt indicator 26, flashers indicator 28, parking brake indicator 29, air pressure indicator 31, trunk open indicator 125, and switch controls. The indicators for switch controls include, as later shown, left front indicator 33, right front indicator 34, left rear indicator 37, and right rear indicator 38 and these four controls regulate pneumatic jack cylinders 12 in each quadrant of a vehicle, particularly its chassis, to operate safely a pneumatic vehicle lift system. The indicators utilize light emitting diodes or LEDs to signal a user as to their status and the operation of the invention; where left refers to the left of a vehicle when facing its front and rear refers to the back of a vehicle away from an operator. The hardware of the invention, as at 42, 45, 47, 52, 57, remains enclosed within a housing 20 construction of metal, polymers, and the like. The housing has a backing plate 30, a bottom mounting plate 40, and an opposite top mounting plate 50 that completes the enclosure of the invention's hardware as at 42, 45, 47, 52, 57. The bottom mounting plate is mutually parallel and spaced apart from the top mounting plate. The backing plate is perpendicular to the bottom mounting plate and parallel to the control panel 10. The output board and the input board are generally coplanar with the program control board positioned between them.

Figure 2:
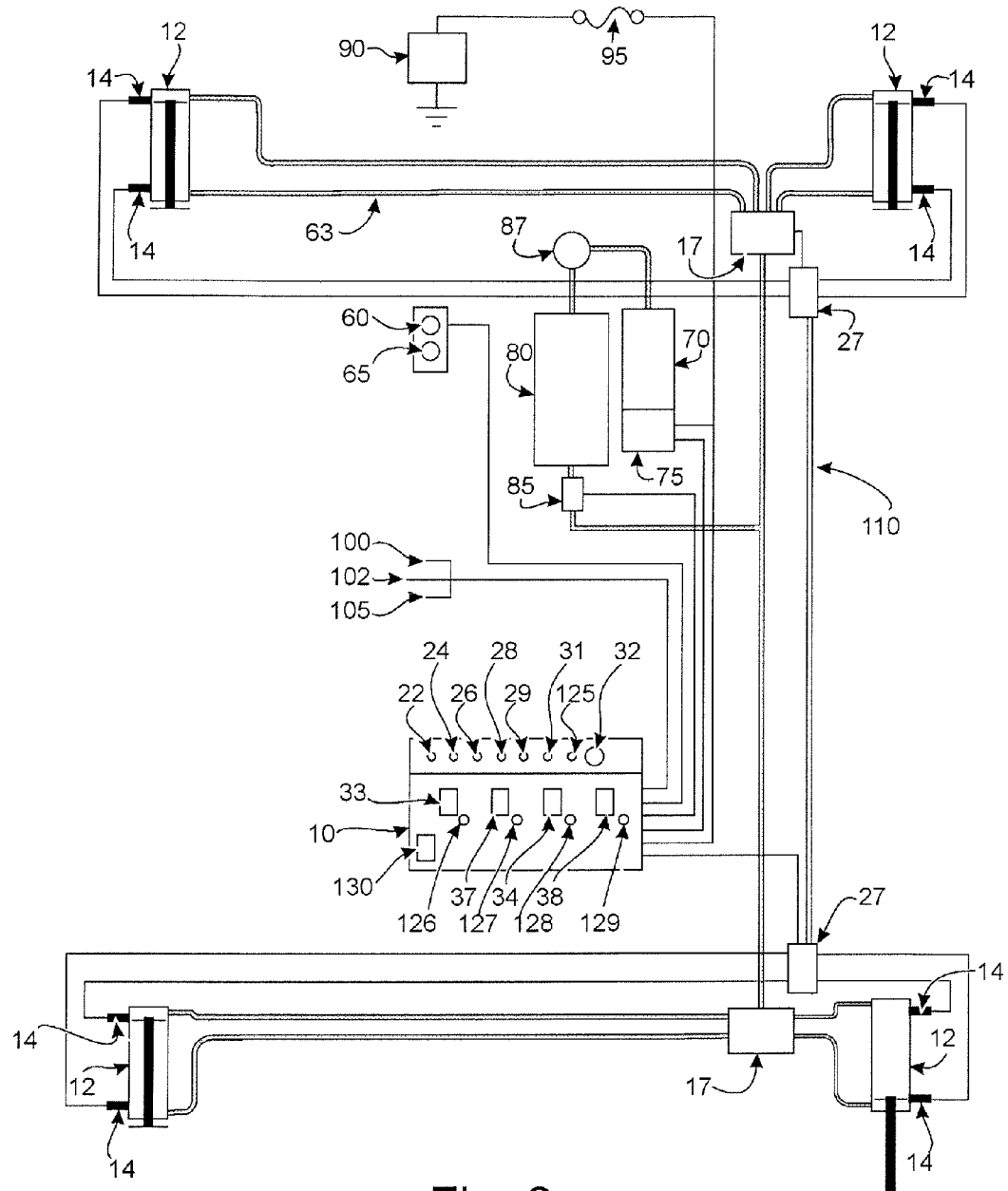
FIG. 2 shows a circuit diagram and air flow diagram of the invention.

FIG. 2 shows the present invention in a circuit diagram in concert with an air hose layout of a pneumatic vehicle safely lift system. Though a pneumatic system is described, the Applicant foresees the invention operating upon other power sources such as hydraulic and solely electrical. The system of the invention includes a plurality of pneumatic jack cylinders 12 disposed around a vehicle to lift it upwardly, as when aground in snow or mud, a plurality of proximity switches 14 that sense a piston stroke position, and an air valve assembly 17. The air valve assembly 17 further includes an air distribution manifold, a plurality of solenoids, at least one check valve to regulate air flow, and at least one air restrictor to control the rate of air flow. The cylinders 12, switches 14, and air valve assembly 17 have placements upon a vehicle near wheels. The invention also has junction boxes 27 present for convenient wire connections also within a vehicle. Behind the control panel 10, the invention has an audible alert 60 that warns an operator and a cabin indicator 65 that provides a visual warning to an operator using a tri-color light emitting diode. Select junction boxes leads to at least one air compressor 70 that produces compressed air, air hoses as at 63 to transport air at a carry pressure, a compressor relay 75 that controls electrical current flow, an air reservoir 80, or tank, to store air at a ready pressure, a pressure switch 85 that measures the air pressure in the present invention, particularly before the cylinders 12, an air dryer 87 to control humidity within the air hoses 63 and reservoir 80, an electrical power supply such as a vehicle battery 90 serving as a power source that has a battery return from input devices and output devices, and separate wire connections as at 110. The wire connections in this figure have a single point attachment to a vehicle that lessens electrical noise considerations.

In the invention, all electrical components have a ground where at least one fuse 95 protects the wire connections and other components in the event of a component failure, such as one jack cylinder, or accidental damage, such as from a collision, that may cause an excess of current flow and hence a fire. The fuses 95 and wiring as at 110 have sizes for the expected current flow. The input devices include an interlock switch 100 as another input, hazard flashers 102 as another input, a trunk open indicator 105 as another input, and like inputs that cooperate to create a safe sequence of operation. The object program of the invention includes coding for safe operation of the invention, particularly single jack extension.

The present invention, as mentioned above, has its electronic interface control panel 10 with indicators. The indicators include a lug wrench indicator 22, safety strut indicator 24, excessive tilt indicator 26, flashers indicator 28, parking brake indicator 29, air pressure indicator 31, trunk open indicator 125, a system start indicator 32, a left front switch indicator 33, a right front switch indicator 34, a left rear switch indicator 37, and a right rear switch indicator 38. These four controls regulate the pneumatic jack cylinders 12 in each quadrant of a vehicle known left front indicator 126, a right front indicator 127, a left rear indicator 128, and a right rear indicator 129 respectively. The goal of the indicators and of the remainder of the invention is to operate safely a pneumatic vehicle lift system.

Figure 3:
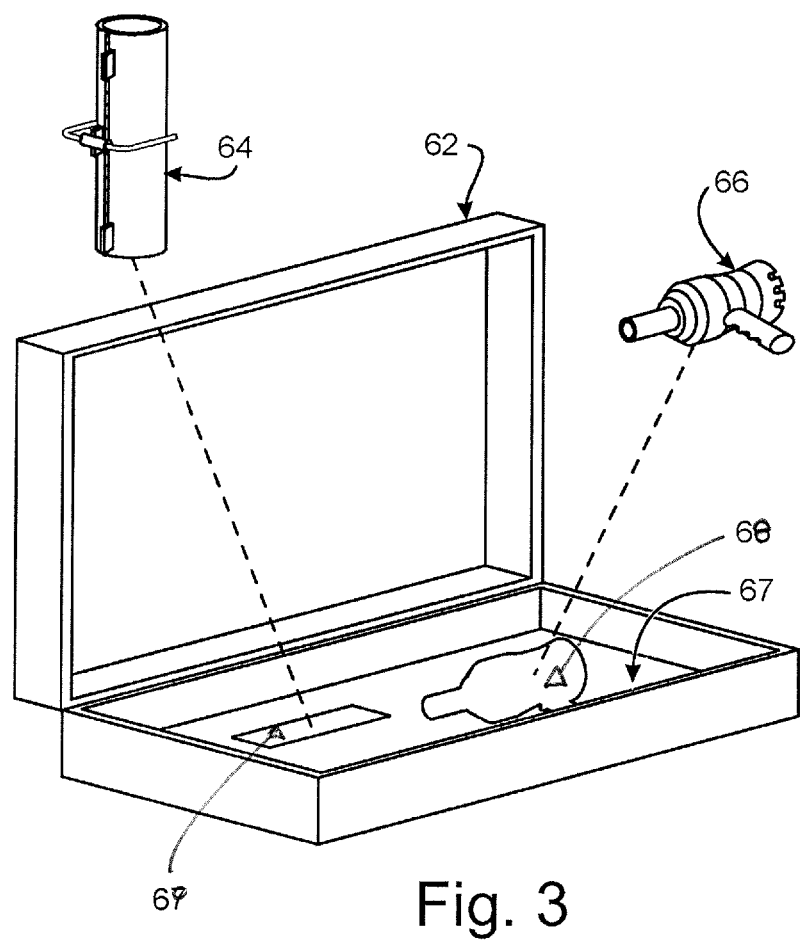
FIG. 3 describes an exploded view of a case for the invention.

FIG. 3 displays an exploded view of a carrying case for the invention. The carrying case 62 includes within it a safety strut 64 with its mechanical locking mechanism and a cordless electric torque wrench. The carrying case has a safety strut 64 with its mechanical locking mechanism 53 and at least one hinge 54, an electric torque wrench 66 that removes lug nuts, and a foam insert 67 that cradles the other components. The safety strut has its hinge connecting two leaves that have an open position, later shown in FIG. 5, and a closed position shown in this figure. The closed position of the leaves forms a hollow cylinder suitable for placement around the piston of a cylinder later shown. The carrying case has two switches 68, 69 wired to the electronic interface control panel that indicate the presence of the safety strut 64 and the torque wrench 66. The case has a switch 68 within the foam insert 67 beneath the pocket for the torque wrench 66 and a switch 69 also within the foam insert 67 but beneath the pocket for the safety strut 69. Preferably, these two switches remain closed when their torque wrench and safety strut occupy their respective pockets. The switches open their respective circuits in the absence of the torque wrench and safety strut as later described in FIGS. 6, 6*a*-6*m*. These two switches have a bias open.

Figure 4:
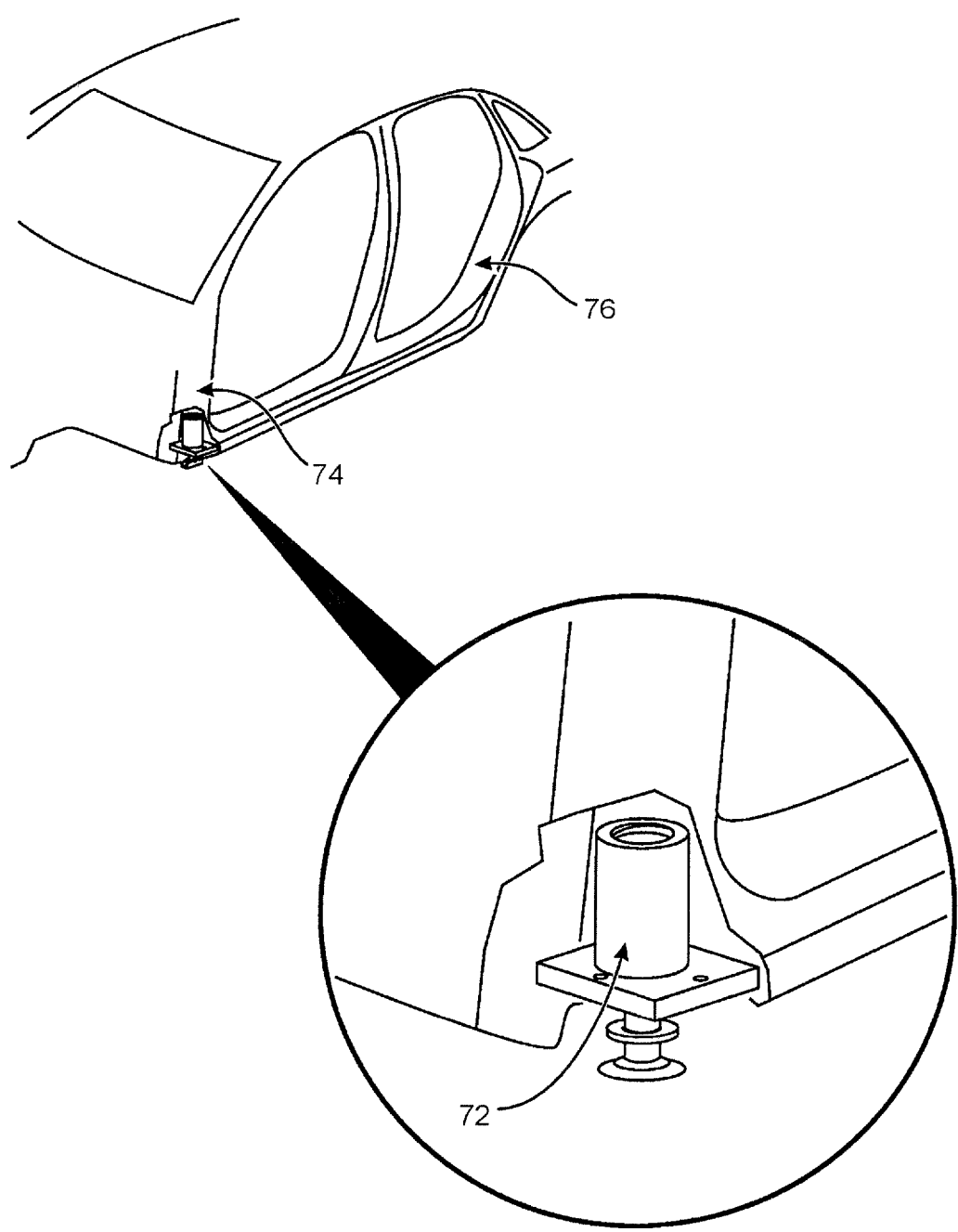
FIG. 4 illustrates a side cutaway view of an alternate embodiment of the invention onboard a vehicle.

FIG. 4 then shows a pneumatic vehicle safety lift system in a cutaway view onboard a vehicle. This system has a pneumatic jack cylinder mounted on the vehicle that then safely and conveniently lifts a vehicle upward such as for repairs, for changing of a tire, becoming unstuck, and the like. More particularly, this figure has a cylinder assembly 72 with its pneumatic jack cylinder and piston. The jack cylinder mounts to the pillar 74 and dogleg 76 upon a vehicle. This mounting allows for the safe and convenient lifting of a vehicle that is stuck in mud or snow or for repairs or tire changing.

Figure 5:
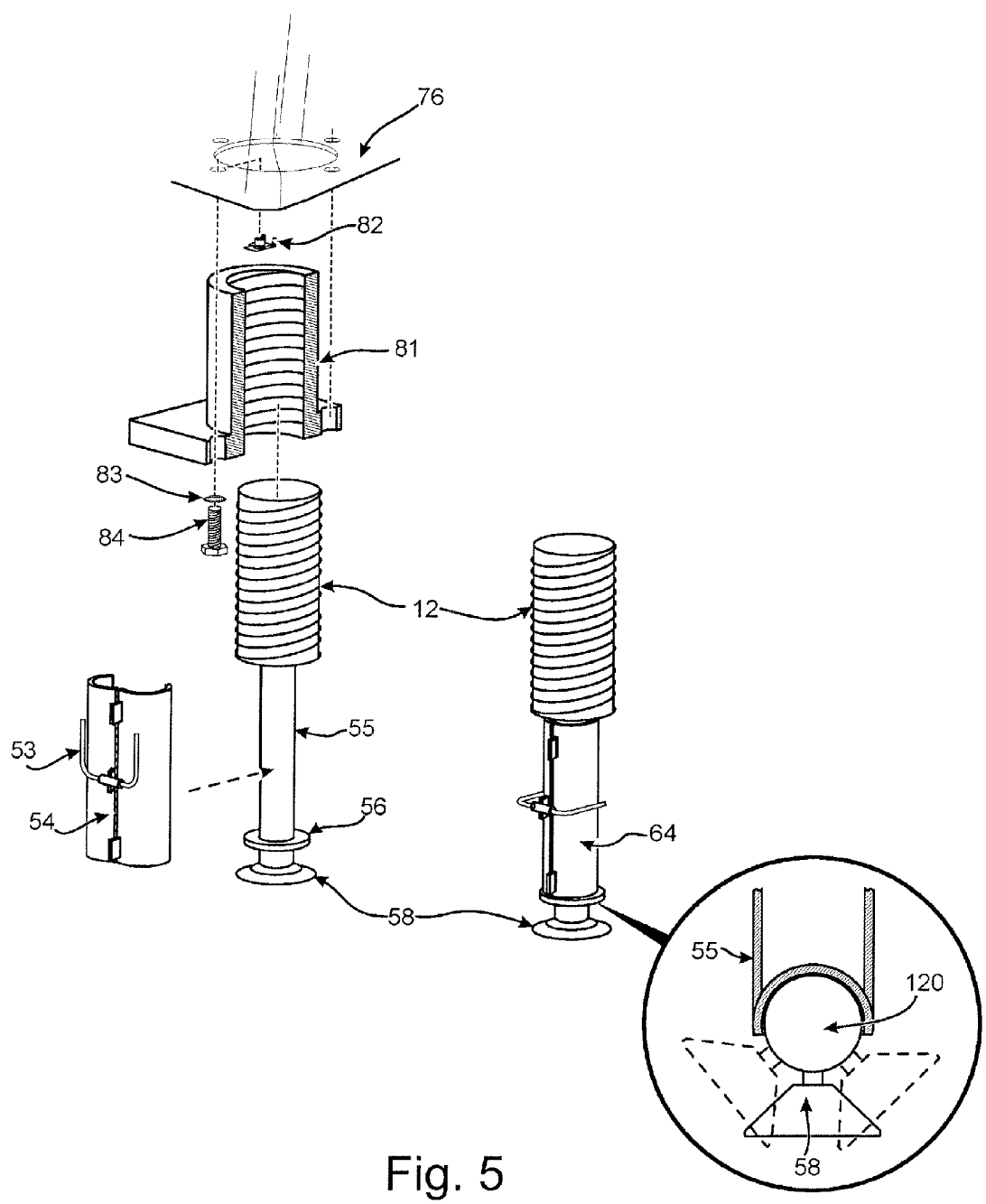
FIG. 5 provides an exploded view, to the left of the figure, of the alternate embodiment of the invention, a side view to the right of the figure, and a detailed view to the lower right of the figure.

FIG. 5 then provides an exploded view of a cylinder assembly of a pneumatic vehicle safely lift system. This system includes a plurality of pneumatic jack cylinders, a safety strut with a mechanical locking mechanism, a safety strut platform, a plurality of threaded mounting cylinder caps and mechanical fasteners, and at least one ball bearing. The ball bearing operates in close tolerance or with mechanical connection to an end of a pneumatic jack cylinder piston rod. The ball bearing and the piston rod cooperate in positioning a footplate that adapts to different terrain, surfaces, and slopes. The ball bearing and the piston rod cooperate with the remainder of the invention for safe and convenient lifting of a vehicle for repairs, changing of a tire, and becoming unstuck from mud or snow.

This figure then shows a cylinder assembly with pneumatic jack cylinders 12, cylinder pistons being magnetic for detection of stroke positions by magnetically activated sensors, and at least four pistons as at 55. Each piston has at lease one ball bearing 120 in a close tolerance fit or a mechanical fastening to an end of a shaft of a footplate 58. The ball bearing permits an orbital range of motion for the footplate as it adapts to a ground surface beneath the jack cylinder during usage. The assembly then further includes a safety strut 64 with at least one hinge 54 and a mechanical lock mechanism 53 that prevents failure of the pneumatic jack cylinders 12. The safety strut 64 illuminates with an LED, retro-reflector or retro-reflective tape or other opto-mechanical means. The assembly also has a plurality of threaded mounting cylinder caps 81 related to each cylinder 12 and mechanical fasteners including Tinnerman nuts 82, washers 83, and bolts 84. The components of the assembly individually and collectively cooperate to safely and conveniently lift a vehicle stuck in mud or snow, or undergoing repairs or a tire change. The jack cylinders 12 have placement strategically upon a vehicle, generally near each wheel and an efficient mounting. The mountings for the cylinders to the chassis include mechanical fastening to the vehicle body or unibody, close tolerance snap fit, welding, brazing, and chemical bonding. The jack cylinders 12 themselves include construction from aluminum, tungsten, polymers, composites, ferrous and non-ferrous metals, their alloy, carbon fiber, and steel.

Figure 6:
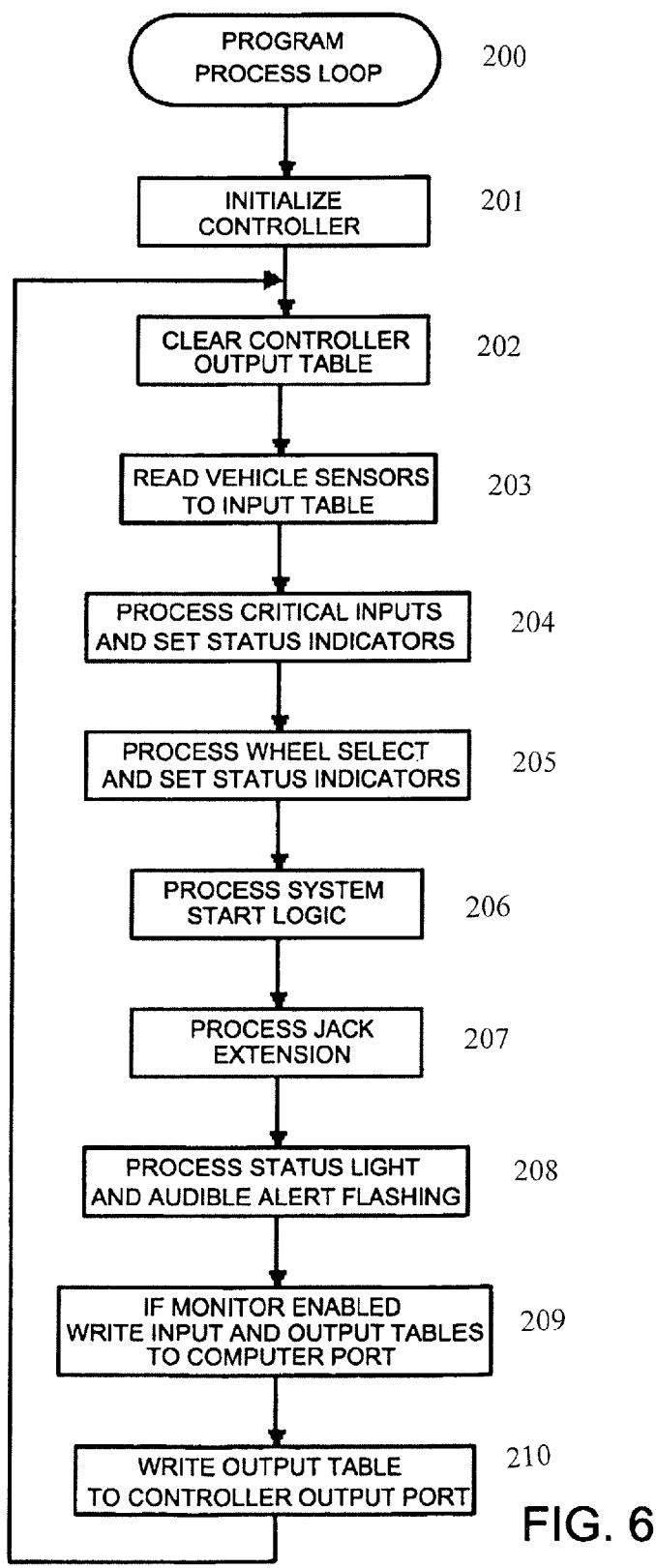
FIG. 6 provides a flow chart of a process loop.

FIG. 6 then shows a flow chart of a linear program process loop, as at 200. The loop moves to initialize a controller as at 201 and clear controller output table step as at 202. The loop continues with the step of read vehicle sensors to input table as at 203 and then the step of process critical inputs and set status indicators as at 204. Following those two steps, the loop then processes wheel selection and sets status indicators as at 205. The loop proceeds to process system start logic as at 206 and then process one or more jack extensions as at 207. The loop then begins an output with process status light and audible alert flashing 208. If the loop operates on equipment with a monitor, the loop writes input and output tables to a computer port as at 209. The loop then winds down with the step of write output table to controller output port as at 210. Completing that step, the loop then returns above to the clear controller output table as at 202.

Figure 6A:
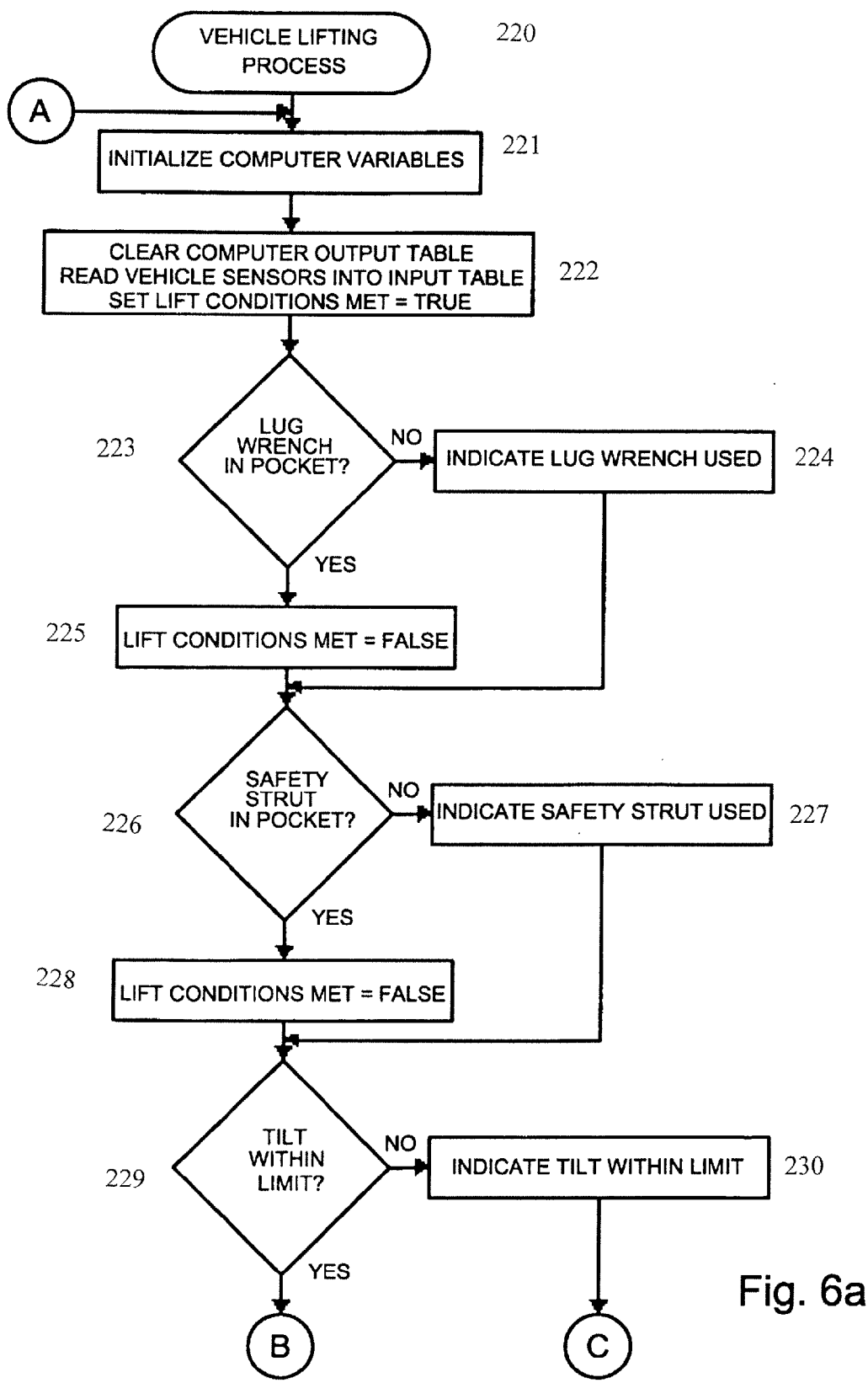
FIG. 6a provides a portion of a detailed flow chart of a process loop, showing match points A, B, C.

FIG. 6*a* shows the flow chart of the logic for the vehicle lifting process using the invention, as at 220. This process begins with initializing computer variables as at 221 and then clearing the computer output table along with reading of vehicle sensors into an input table and setting lift conditions met as TRUE with this step shown as at 222. The process then inquires of its inputs "is the lug wrench in its pocket?" as at 223. A negative response denotes usage of a lug wrench and the process directs the invention to illuminate the indicator for lug wrench used as at 224. A positive response to the query then denotes no usage of the lug wrench and thus FALSE for meeting of lift conditions as at 225. Next, the process then inquires of its inputs "is the safety strut in its pocket?" as at 226. A negative response denotes usage of a safety strut upon a vehicle in coordination with the remainder of the invention and the process directs the invention to illuminate the indicator for safety strut used as at 227. A positive response to the query then denotes no usage of the safety strut and thus FALSE for meeting of lift conditions as at 228. Then, the process then inquires of its inputs "is the tilt within limit?" as at 229. A negative response denotes tilt of a cylinder upon a footplate as within the angular limits and the process directs the invention to illuminate the indicator for tilt as at 230. A positive response to the query then denotes a cylinder nearly vertical and prepared for lifting. This figure then ends with merge points B, C for linking to the next figure.

Figure 6B:
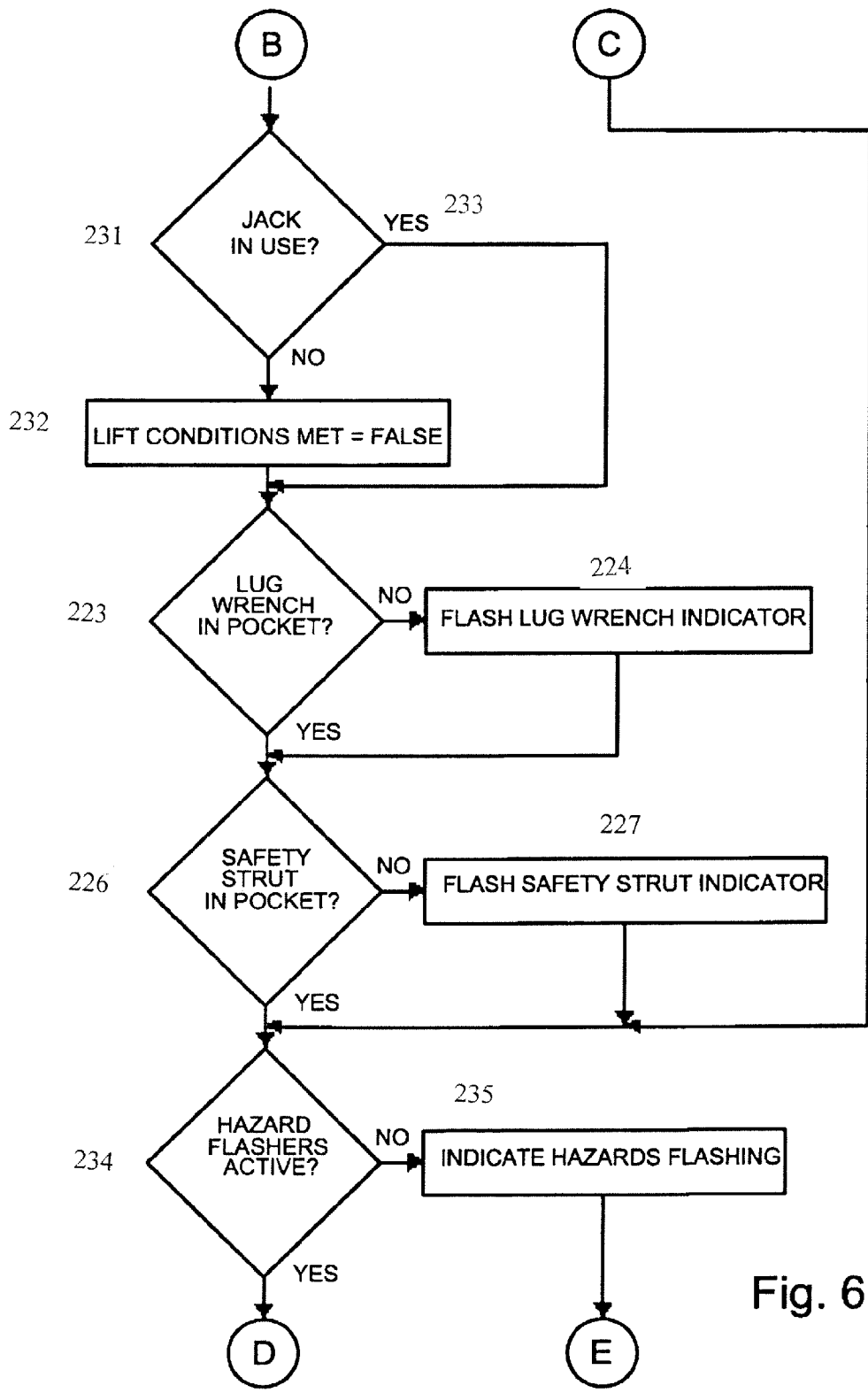
FIG. 6b provides a portion of a detailed flow chart of a process loop, showing match points B, C, D, E.

FIG. 6*b* provides the next section of the flow chart of the logic for the vehicle lifting process using the invention. This figure begins at merge points B, C. Continuing from merge point B, the invention then inquires if a jack is in use as at 231. A negative response notes the lift conditions have not occurred and thus the inquiry of step 231 is false as at 232. A positive response to the inquiry bypasses the false condition of step 232. Next, the invention inquires of the carrying case 62 if a lug wrench is in its pocket, as at 223. A negative response indicates the lug wrench may be in use and thus meets the criterion to flash the lug wrench indicator 22 as at step 224. A positive response to this query denotes the lug wrench as not in use and the invention proceeds to the next query. The next query inquires if the safety strut 64 is in its pocket in the carrying case 62 as at 226. A negative response indicates the safety strut may be in use and thus meets the criterion to flash the safety strut indicator 24 as at step 227. Because the safety strut secures a vehicle body in an elevated position upon a jack 12, a user must heed this indicator 24. A positive response to this query denotes the safety strut has not seen use upon a jack and the invention proceeds to the next query. The invention then queries if the hazard flasher lights on the vehicle have become active as at 234. A negative response indicates the hazard flasher lights appear in the off position though operation of the invention requires their operation. The invention then activates the hazards flashing indicator 28 as at step 235. A positive response to this query denotes a user has previously activated the hazard flasher lights on the vehicle. This figure then ends with merge points D, E for linking to the next figure.

Figure 6C:
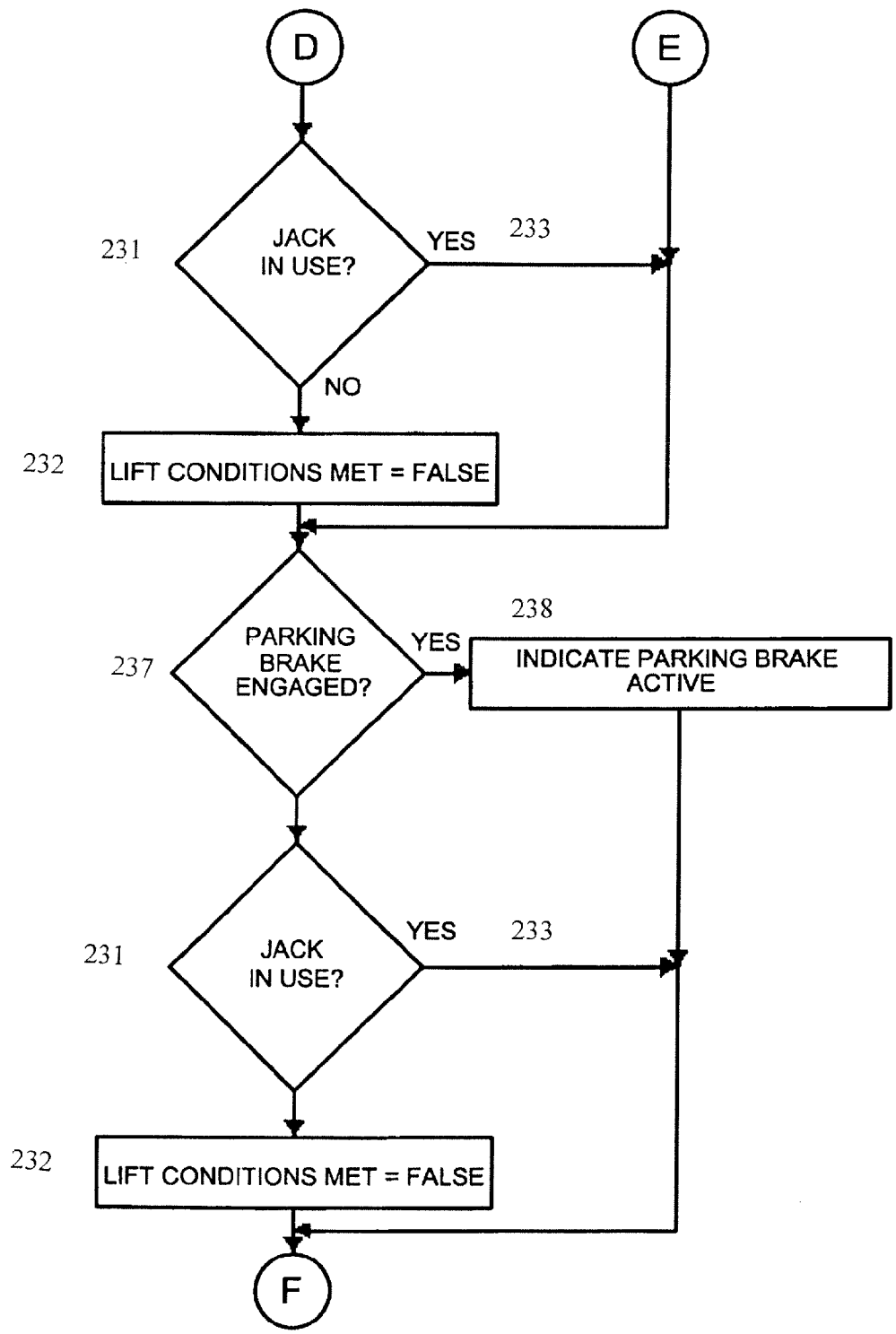
FIG. 6c provides a portion of a detailed flow chart of a process loop, showing match points D, E, F.

FIG. 6*c* provides the next section of the flow chart of the logic for the vehicle lifting process using the invention. This figure begins at merge points D, E and continuing from merge point D, the invention once more inquires if a jack is in use as at 231. A negative response notes the lift conditions have not occurred and thus the inquiry of step 231 is false as at 232. A positive response to the inquiry bypasses the false condition of step 232. Next, the invention reads a data stream from a vehicle if its parking brake is engaged as at 237. A positive response to this query denotes appropriate engagement of the parking brake and causes the invention to illuminate its parking brake indicators 29 as at step 238. A negative response indicates no application of the parking brake and returns the invention to inquire if a jack is in use as at 231. A negative response notes the lift conditions have not occurred and thus the inquiry of step 231 is false as at 232. A positive response to the inquiry bypasses the false condition of step 232. This figure then ends with merge point F for linking to the next figure.

Figure 6D:
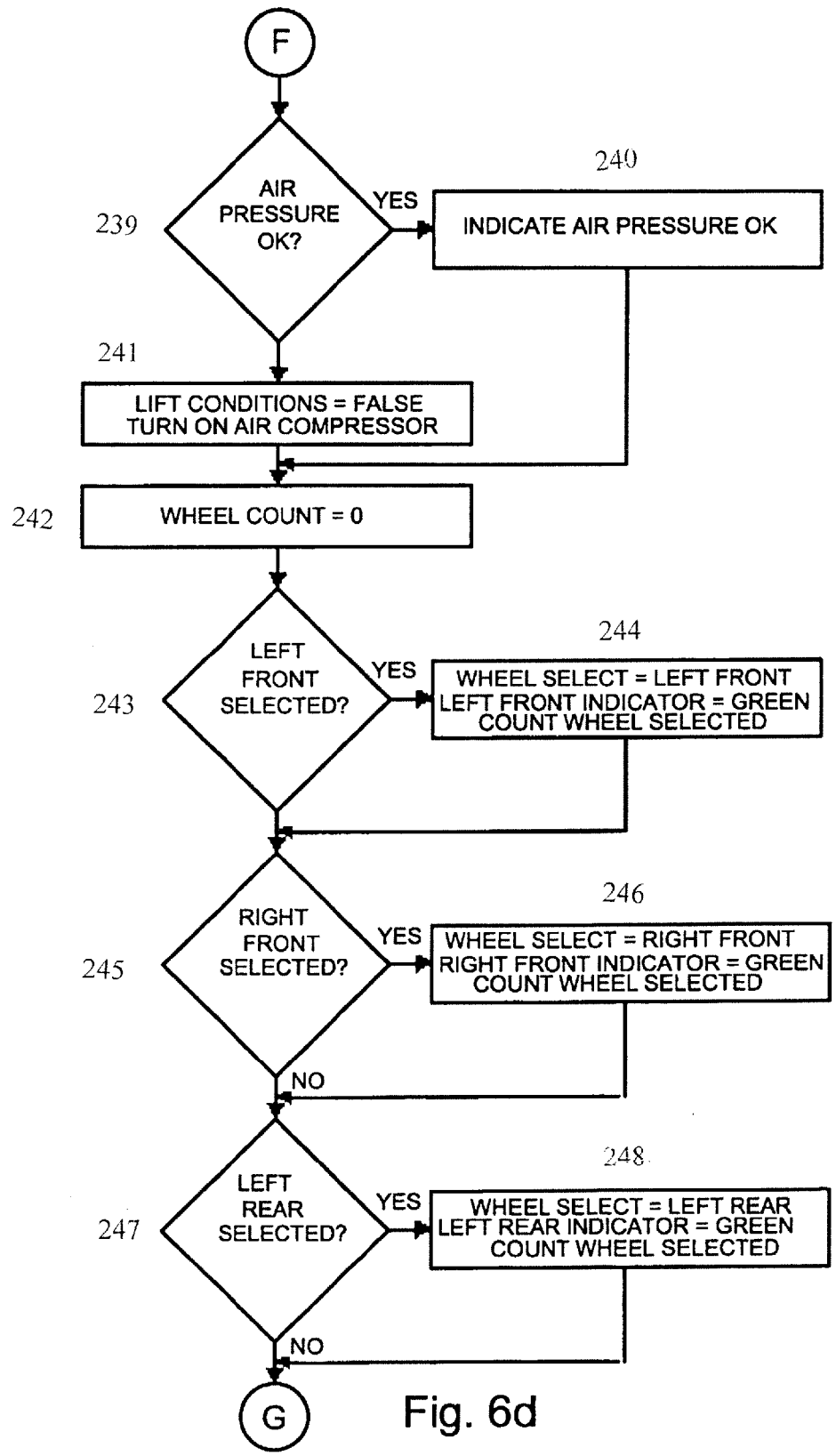
FIG. 6d provides a portion of a detailed flow chart of a process loop, showing match points F, G.

FIG. 6d begins at merge point F and continuing from there, the invention inquires of the air pressure from its compressor 80 in the lines or hoses 63 as at 239. And reads a data stream from a vehicle if its parking brake is engaged as at 237. A positive response to this query denotes appropriate pressure in the lines for operation of the invention and causes the invention to illuminate its air pressure indicator as at step 240. A negative response indicates no previous activation of the compressor and triggers activation of the air compressor as at 241. After an interval, the invention checks its air pressure again for reaching the minimum value, over 14 psi. With the system pressurized for air, the invention then checks its own wheel count as at 242 and sets that count to zero. The invention then prompts a user to select a wheel for application of pressure to a related jack 12. The invention queries if the user selected the left front wheel as at 243. A positive response to the query triggers the wheel select indicator to show left front, the left front indicator to emit as green, and the count wheel to advance to 1 as count wheel selected. These three activities occur at step 244. A negative response about the left front wheel from the user, queries if the user selected the right front wheel as at 245. A positive response to the query triggers the wheel select indicator to show right front, the right front indicator to emit as green, and the count wheel to advance to 1 as count wheel selected. These three activities occur at step 246. Then a negative response about the left front wheel and right front wheel from the user, queries if the user selected the left rear wheel as at 247. A positive response to the query triggers the wheel select indicator to show left rear, the left rear indicator to emit as green, and the count wheel to advance to 1 as count wheel selected. These three activities occur at step 247. And, a negative response about the left front wheel, the right front wheel, and the left rear wheel from the user, has the method of the invention proceeding further. This figure then ends with merge point G for linking to the next figure.

Figure 6E:
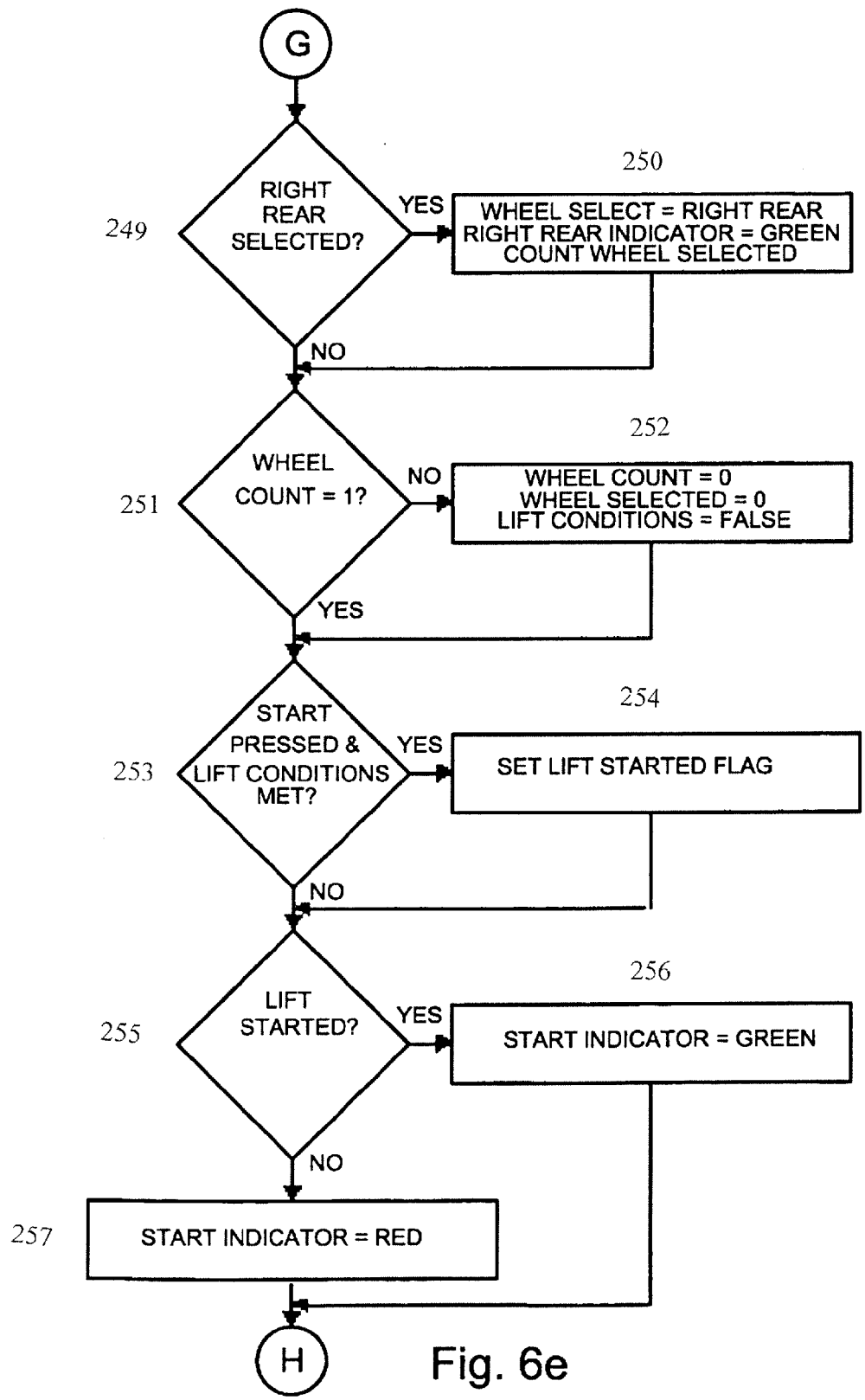
FIG. 6e provides a portion of a detailed flow chart of a process loop, showing match points G, H.

FIG. 6e picks up at merge point G where the invention queries if the user selected the right rear wheel as at 249. A positive response to the query triggers the wheel select indicator to show left rear, the left rear indicator to emit as green, and the count wheel to advance to 1 as count wheel selected. These three activities occur at step 250. And, a negative response about the left front wheel, the right front wheel, the left rear wheel, and the right rear wheel from the user, has the invention check if its wheel count has reached one as at 251. A negative response as at step 252 leaves the wheel count at zero, the wheel selected at zero and the lift conditions as false. The invention prevents any jack from engaging during false lift conditions. A positive response from the wheel count query at step 251 leads to the next query at step 253 where the invention checks if a user has pressed a start button and the lift conditions have been met. A positive response here triggers setting of the lift started flag as at 254. But a negative response to this query leads to another check. The invention checks to see if a lift has started as at 255. A starting occurs when a jack begins to extend its piston 55 downwardly, that is, beneath the body of an automobile. A positive response to this check has the invention change the start indicator 32 to green as at 256. But a negative response to this check turns the start indicator red as at 257. This figure then ends with merge point H for linking to the next figure.

Figure 6F:
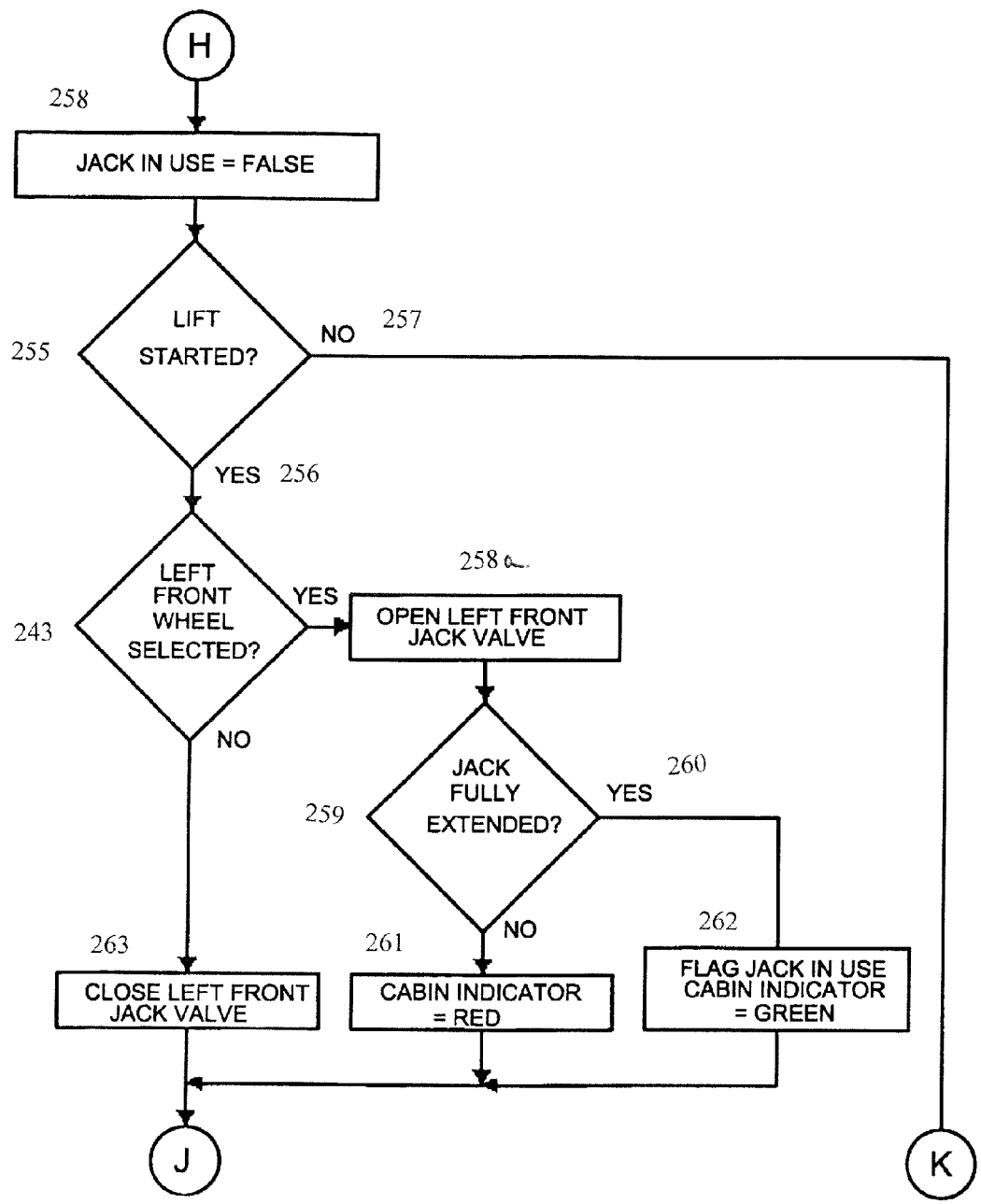
FIG. 6f provides a portion of a detailed flow chart of a process loop, showing match points H, J, K.

FIG. 6f resumes at merge point H where the invention queries if any jack is in use as at step 258 and upon detecting none so in use, the invention advances. In the next inquiry, the invention checks if a lift of a vehicle has started, as at 255. A negative response leads to another branch of the method as at step 257 that continues forward to FIG. 6h later described. A positive response leads to the next query series as at 256 regarding the wheels. The invention queries if the user selected the left front wheel as at 243, previously mentioned in FIG. 6d. A positive response to the query triggers the opening of the left front jack valve as at 258 letting pressurized air enter that one jack. The invention then checks if that jack has fully extended as at 259. Upon detecting full extension or a positive response 260 to the query, the invention turns the jack in use cabin indicator 65 to green as at step 262. But upon not detecting full extension or a negative response to the query, the invention turns the jack in use cabin indicator 65 to red as at step 261. But a negative response to the query about selection of the left front wheel, thus causes the closure of the left front jack valve as at step 263. The query series continues through merge point J. This figure then ends with merge points J, K for linking to the next figure.

Figure 6G:
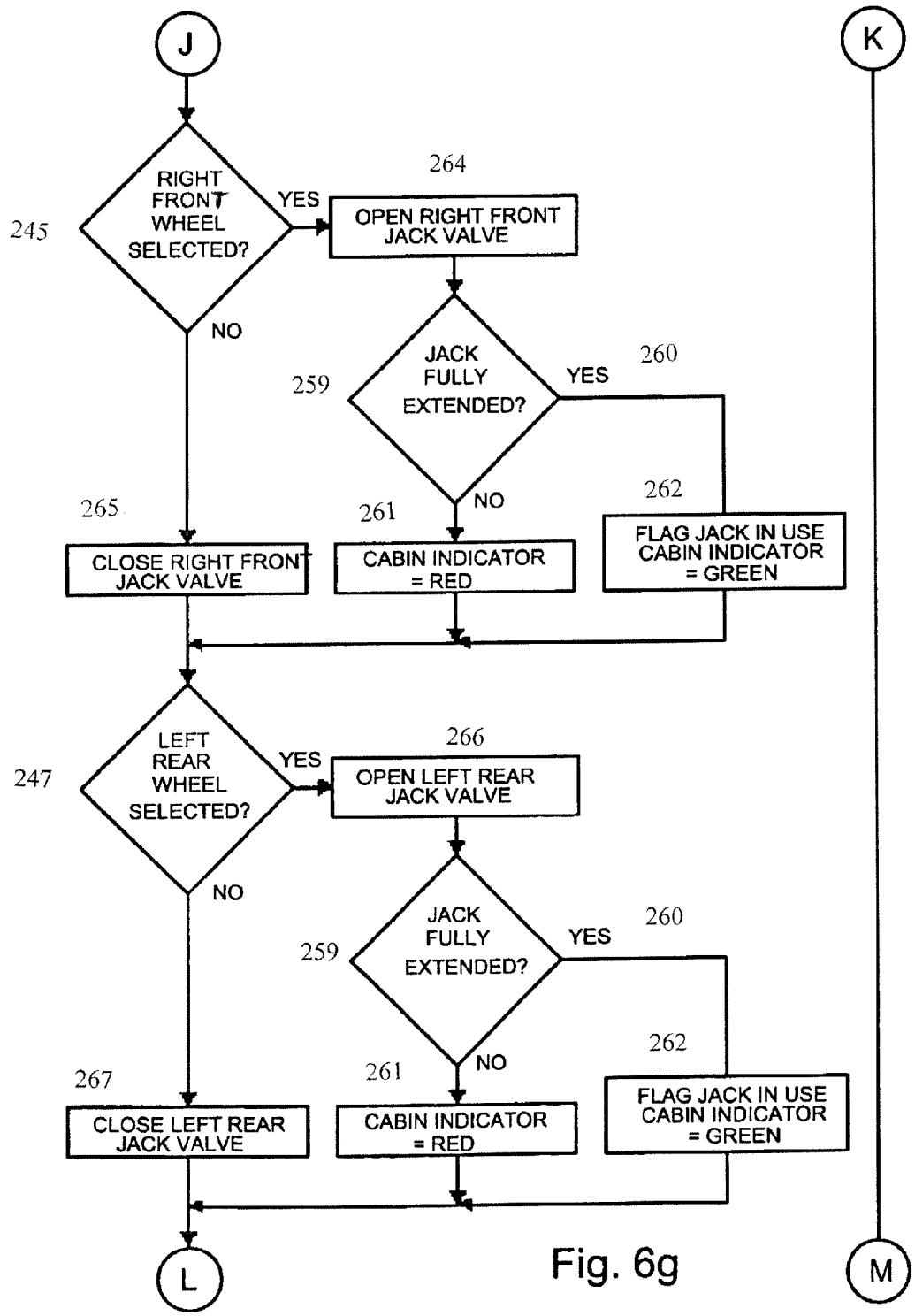
FIG. 6g provides a portion of a detailed flow chart of a process loop, showing match points J, K, L, M.

FIG. 6g continues from merge point J with the next query in the series of the invention, if the user selected the right front wheel as at 245, previously mentioned in FIG. 6d. A positive response to the query triggers the opening of the right front jack valve as at 264 letting pressurized air enter that one jack. The invention then checks if that jack has fully extended as at 259. Upon detecting full extension or a positive response 260 to the query, the invention turns the jack in use cabin indicator 65 to green as at step 262. But upon not detecting full extension or a negative response to the query, the invention turns the jack in use cabin indicator 65 to red as at step 261. But a negative response to the query about selection of the left front wheel, thus causes the closure of the right front jack valve as at step 265. With two wheels not selected so far, the invention queries next if the user selected the left rear wheel as at 247, previously mentioned in FIG. 6d. A positive response to the query triggers the opening of the left rear jack valve as at 266 for entrance of pressurized air into that one jack. The invention then checks if that jack has fully extended as at 259. Upon detecting full extension or a positive response 260 to the query, the invention turns the jack in use cabin indicator 65 to green as at step 262. But upon not detecting full extension or a negative response to the query, the invention turns the jack in use cabin indicator 65 to red as at step 261. But a negative response to the query about selection of the left rear wheel, thus causes the closure of the left rear jack valve as at step 267. This figure then ends with merge points L, M for linking to the next figure.

Figure 6H:
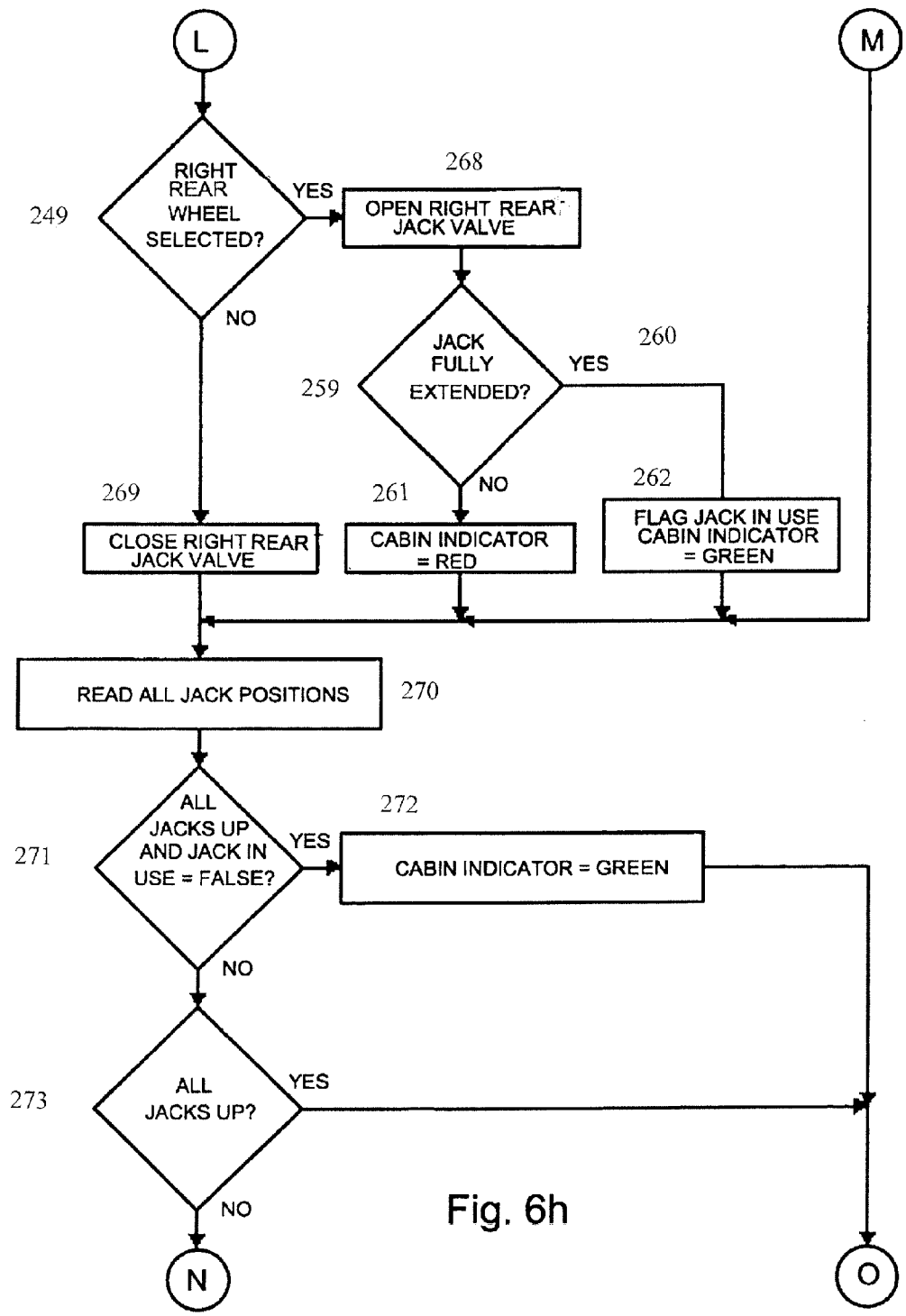
FIG. 6h provides a portion of a detailed flow chart of a process loop, showing match points L, M, N, O.

Turning to FIG. 6h, the invention continues from merge point L with the next query in the series of the invention after negative response to the previous three queries, if the user selected the right rear wheel as at 249, previously mentioned in FIG. 6e. A positive response to the query triggers the opening of the right rear jack valve as at 268 bring pressurized air into that one jack. The invention then checks if that jack has fully extended as at 259. Upon detecting full extension or a positive response 260 to the query, the invention turns the jack in use cabin indicator 65 to green as at step 262. But upon not detecting full extension or a negative response to the query, the invention turns the jack in use cabin indicator 65 to red as at step 261. But a negative response to the query about selection of the right rear wheel, thus causes the closure of the right rear jack valve as at step 269. Over two figures, the invention has queried the status of four jacks and then the invention reads that status as at step 270. The invention then checks if all jacks are up and all jacks in use being false as at step 271. A positive response to that query, indicating a false status with no jacks in use, allows the invention to turn the cabin indicator green as at step 272. But a negative response to that query with either one jack down or one jack in use triggers a next query of all jacks being up as at step 273. A positive response leads to a branch in logic of merge point O while a negative response leads to merge point N. This figure then ends with merge points N, O for linking to the next figure.

Figure 6I:
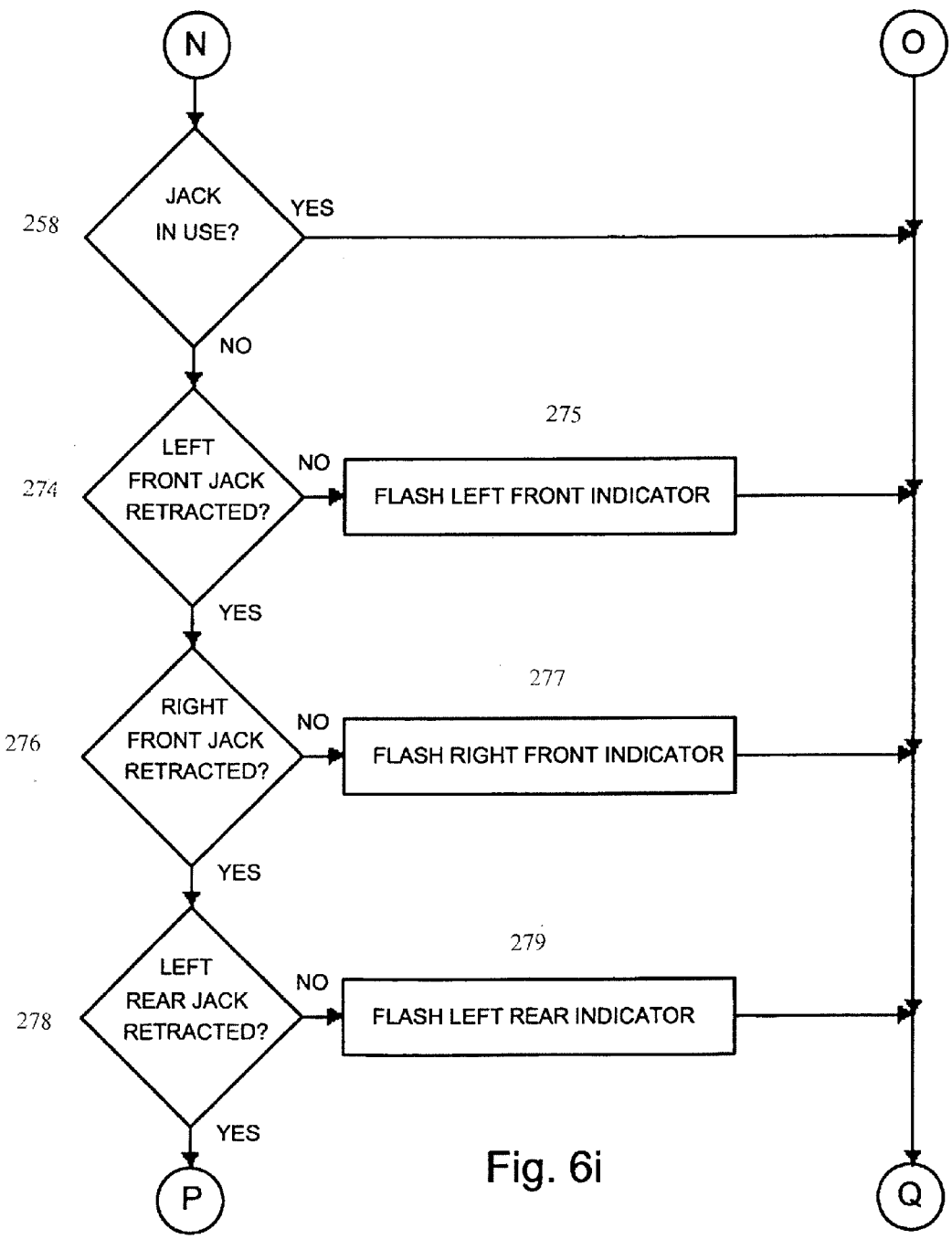
FIG. 6i provides a portion of a detailed flow chart of a process loop, showing match points N, O, P, Q.

And looking at FIG. 6*i*, the invention extends the logic of merge point O past the steps shown in this figure to merge point Q. The invention continues the negative response to step 273 of the previous figure to the next query of any jack being in use as at step 258. A positive response sends the invention to the logic of merge point O. A negative response begins a series of queries to identify a jack to the user. The invention then checks if the left front jack has retracted as at step 274. If it has not retracted, the invention flashes the left front indicator as at step 275 and sends the invention to the logic after merge point O. If it has retracted, the invention proceeds to check if the right front jack has retracted as at step 276. If it has not retracted, the invention flashes the right front indicator as at step 277 and sends the invention to the logic after merge point O. If it has retracted, the invention proceeds to check if the left rear jack has retracted as at step 278. If it has not retracted, the invention flashes the left rear indicator as at step 279 and sends the invention to the logic towards merge point Q. If it has retracted, the invention continues its logic through merge point P. This figure then ends with merge points P, Q for linking to the next figure.

Figure 6J:
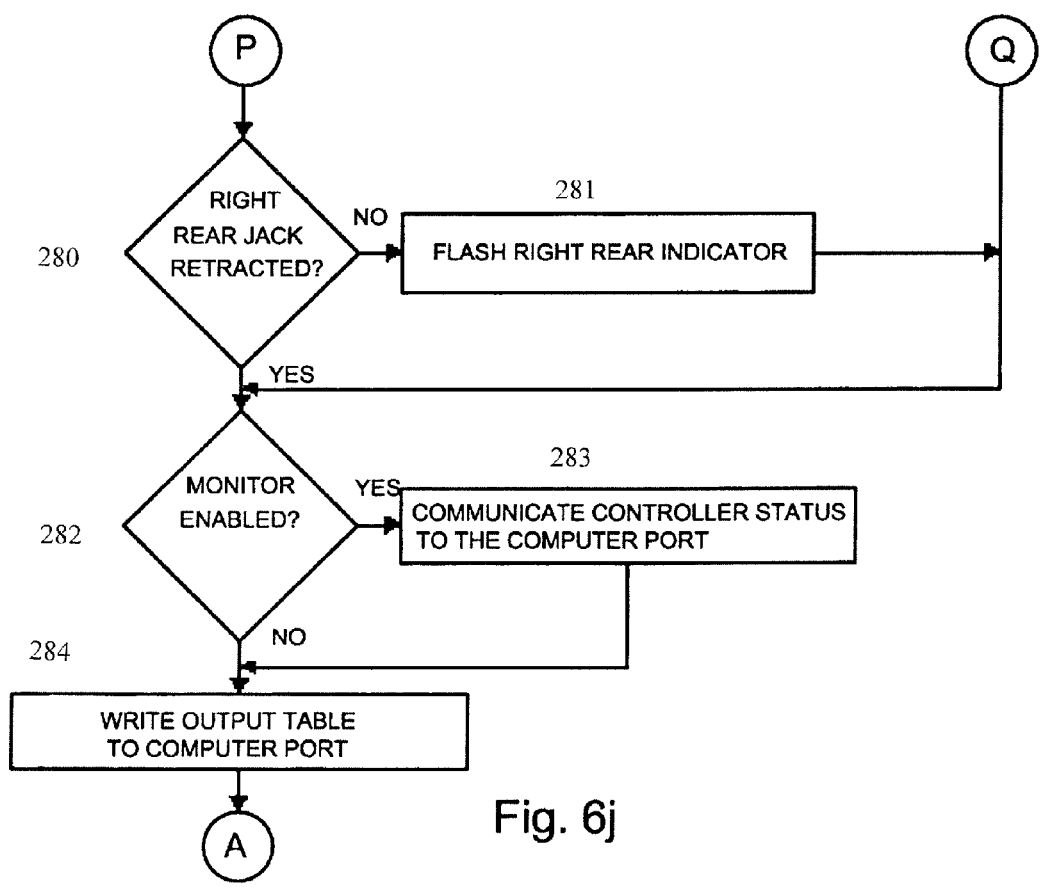
FIG. 6j provides a portion of a detailed flow chart of a process loop, showing match points P, Q, A.

Reviewing FIG. 6*j*, the invention extends the logic of merge point Q and its predecessor O. If the left rear jack has retracted, the invention proceeds to check if the right rear jack has retracted as at step 280. If it has not retracted, the invention flashes the right rear indicator as at step 281 and sends the invention to the logic after merge point Q. If it has retracted, the invention then proceeds to check if its monitor has enabled as at step 282. After the four jack retracted indicators flash, the logic of merge points O, Q, this branch of the invention returns to its monitor. With an enabled monitor, the invention then communicates the controller status to the computer port as at step 283. If the monitor is not enabled, the invention then writes an output table to the computer port as at step 284. This figure then ends with merge point A for linking back to FIG. 6*a*

Figure 6K:
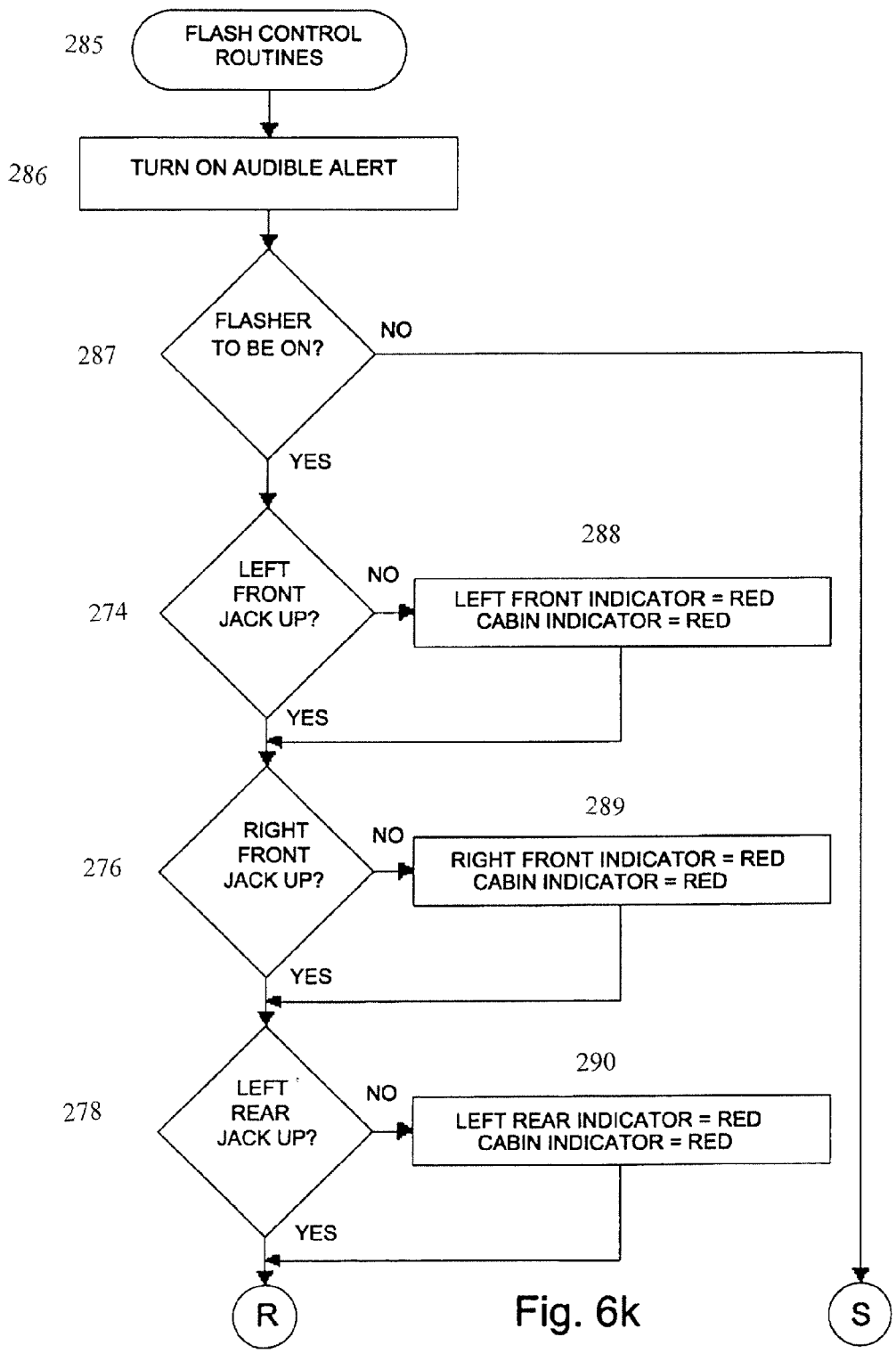
FIG. 6k provides a portion of a detailed flow chart of a process loop, showing match points R, S.
Figure 6I:
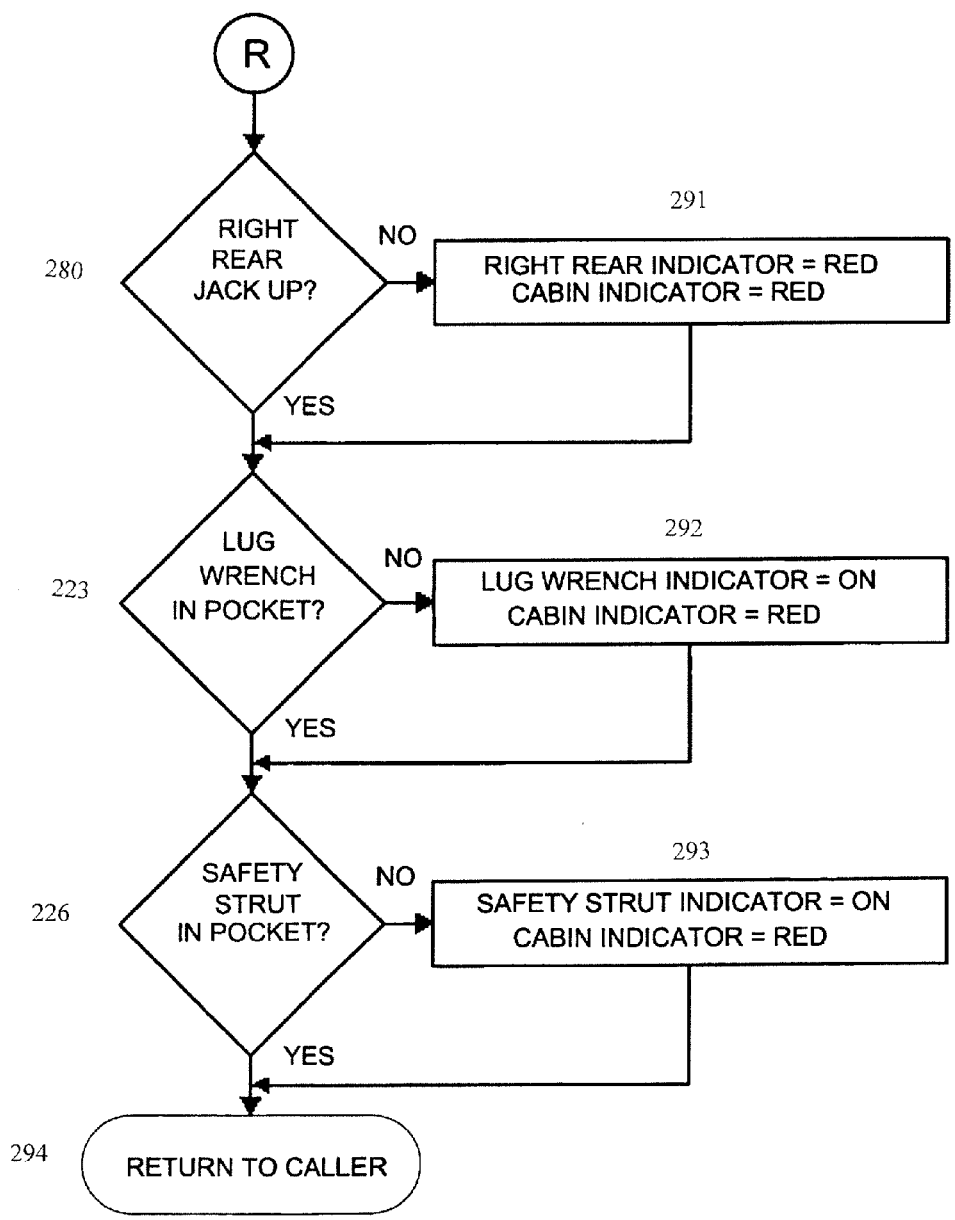

Now turning to FIG. 6*k*, the invention provides another branch of its operations. This branch provides indicators to a user and begins with flashing of control routines as at 285. The invention then turns on the audible alert 286 with a speaker or buzzer near the user. The invention then queries if the hazard flashers are to be on as at 287. A negative response bypasses the remainder of this figure to merge point S. A positive response about the hazard flashers then triggers a series of queries begins with is the left front jack to be up as at 274 as previously shown and described in FIG. 6*i*. A negative response to this query triggers the left front indicator displaying as red and the cabin indicator as red as at step 288. A negative response shows that a jack remains down or extended. A positive response notes the left front jack has retracted and leads to the next query. The invention checks if the right front jack is to be up as at 276 as previously shown and described in FIG. 6*i*. A negative response to this query triggers the right front indicator displaying as red and the cabin indicator as red as at step 289. A negative response shows that a jack remains down or extended. A positive response notes the right front jack has retracted and leads to the next query. So the invention checks if the left rear jack is up as at 278 as previously shown and described in FIG. 6*i*. A negative response to this query triggers the left rear indicator displaying as red and the cabin indicator as red as at step 290. A negative response shows that a jack remains down or extended. A positive response notes the left rear jack has retracted and leads to the next query of this series. This figure then ends with merge points R, S for linking back to the next two figures.

FIG. 6*l* continues the logic from merge point R and checks if the right rear jack is up as at 280 as previously shown and described in FIG. 6*j*. A negative response to this query triggers the right rear indicator displaying as red and the cabin indicator as red as at step 291. A positive response notes the right rear jack has retracted. Having checked the status of the four jacks, the invention then checks if a lug wrench is in its pocket in the carrying case, as at 223. A negative response indicates the lug wrench meets the criterion to flash the lug wrench indicator as on and turn the cabin indicator as red as at step 292. A positive response to this query denotes the lug wrench as not in use and where it should be in the carrying case and the invention proceeds to the next query. The next query inquires if the safety strut 64 is in its pocket in the carrying case 62 as at 226. A negative response indicates the safety strut may still be in use on a jack and thus meets the criterion to turn on the safety strut indicator 24 and turn the cabin indicator to red as at step 293. A positive response to this query denotes the safety strut has returned to its place in the carrying case following usage. The invention then returns to a caller, or steady state, as a 294.

Figure 6M:
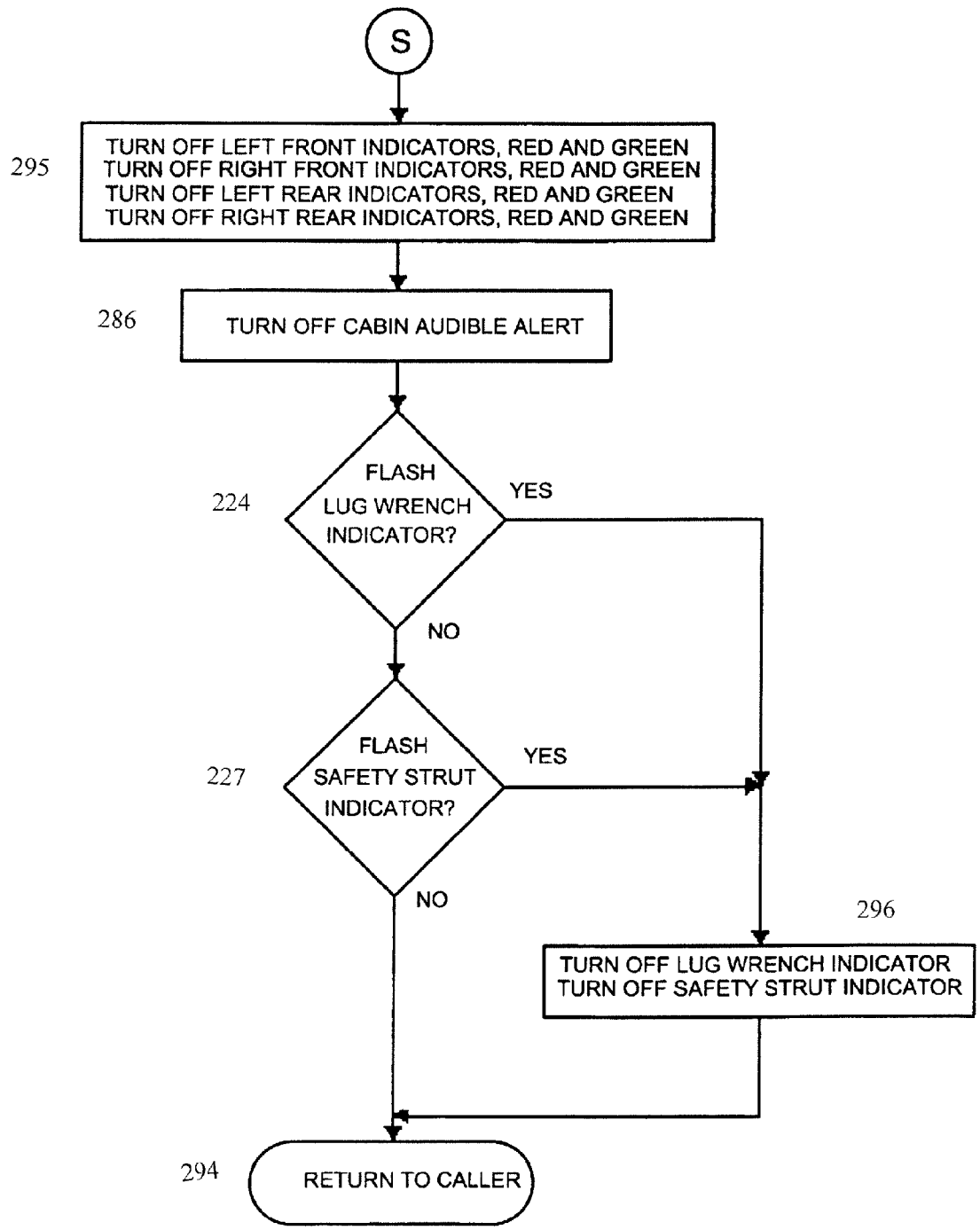
FIG. 6m provides a portion of a detailed flow chart of a process loop, showing match point S; and, FIG. 7 shows a flow chart showing information flow through a computer of the invention.

Building on the description of FIG. 6*k*, FIG. 6*m* shows the resumption of the method of the invention from merge point S. FIG. 6*m* shows the winding down of the invention following its usage and stowage of equipment. With the hazard flasher off upon a vehicle, the invention then turns off these indicators, as at step 295, left front, red and green; right front, red and green; left rear, red and green; and, right rear, red and green. With those indicators off, the invention then turns off the cabin audible alert as at step 286 and proceeds to remaining queries. As previously mentioned and shown in FIG. 6*b*, the invention checks if it should flash the lug wrench indicator as at 224. If the response is positive, the invention turns off the lug wrench indicator as at step 296. If the response is negative, then the invention checks if it should flash the safety strut indicator as at 227. If that response is positive, the invention turns off the lug wrench indicator as at step 296. If both the lug wrench indicator and the safety strut indicator ought not be flashed, the invention returns to the caller as at step 294. Also, with the lug wrench and safety strut indicators off, the invention also returns to the caller.

Figure 7:
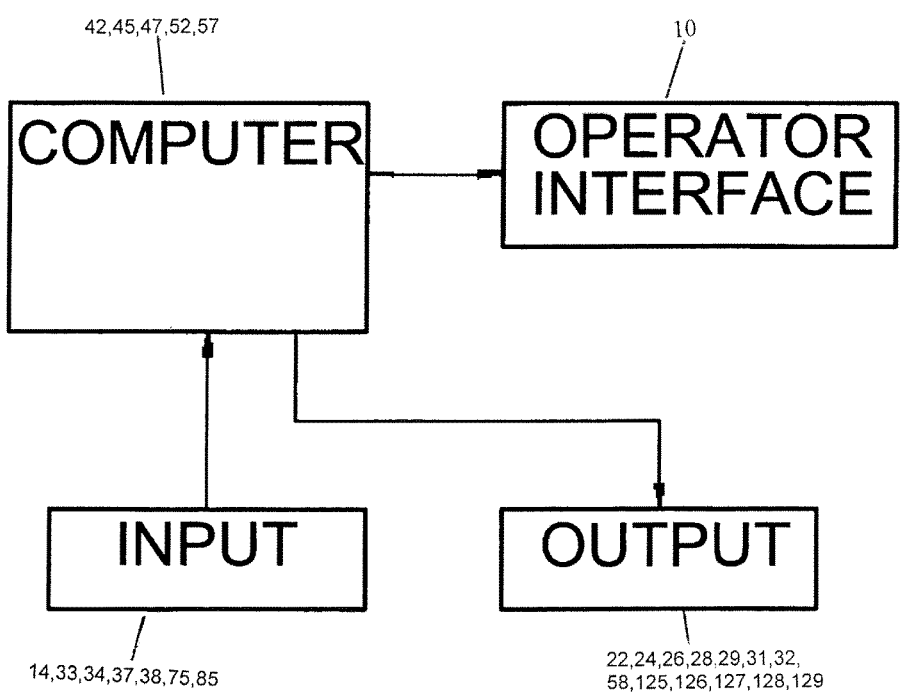

And, FIG. 7 provides a schematic of a computer that receives inputs and presents outputs while subject to an operator interface. The computer includes the input board 42, the output board 45, the program control board 47, the voltage converter board 52, and driver board 57 as previously described. The inputs collect data from proximity switches 14, left front control 33, right front control 34, left rear control 37, right rear control 38, compressor relay 75, and pressure switch 85. The operator interface 10 allows a user to control the invention and the related air, electric, and jacking components. The outputs then present information through lug wrench indicator 22, safety strut indicator 24, tilt indicator 26, hazard flasher indicator 28, parking brake indicator 29, air pressure 31, start indicator 32, footplate 58, trunk open 125, left front wheel indicator 126, right front wheel indicator 127, left rear wheel indicator 128, and right rear wheel indicator 129.

From the aforementioned description, an electronic interface control system for a pneumatic vehicle safety lift system has been described. The electronic interface control system for a pneumatic vehicle safety lift system is uniquely capable of verifying retraction of jacks upon a vehicle prior to use, use of solely one jack, and verifying retraction of jacks after use before the vehicle moves. Further, the electronic interface control system for a pneumatic vehicle safety lift system may also have visual and audible indicators to a user coordinated with jack status. The electronic interface control system for a pneumatic vehicle safety lift system and its various components may be manufactured from many materials, including but not limited to, polymers, such as nylon, polypropylene, polyvinyl chloride, high density polyethylene, polypropylene, ferrous and non-ferrous metal foils, their alloys, ceramics, and composites.

Various aspects of the illustrative embodiments have been described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations have been set forth in order to provide a thorough understanding of the illustrative embodiments. However, it will be apparent to one skilled in the art that the present invention may be practiced without the specific details. In other instances, well known features are omitted or simplified in order not to obscure the illustrative embodiments.

Various operations have been described as multiple discrete operations, in a manner that is most helpful in understanding the present invention, however, the order of description should not be construed as to imply that these operations are necessarily order dependent. In particular, these operations need not be performed in the order of presentation.

Moreover, in the specification and the following claims, the terms "first," "second," "third" and the like—when they appear—are used merely as labels, and are not intended to impose numerical requirements on their objects.

While the above detailed description has shown, described, and pointed out the fundamental novel features of the invention as applied to its various embodiment, it is understood that various substitutions and changes in the form and details of the invention as illustrated may be made by those skilled in the at without departing from the spirit of the invention.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to ascertain the nature of the technical disclosure. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. An electronic interface control system for a pneumatic vehicle safety lift system, comprising: a computer adapted to receive power from an automotive vehicle; a pneumatic system including a compressor and a plurality of hoses, said computer controlling said pneumatic system; at least one jack operatively connected to said pneumatic system for its extension and retraction, said at least one jack adapted to mount upon an automotive vehicle; a plurality of indicators in communication with said computer, said at least one jack, is adapted to communicate with sensors from an automotive vehicle, and providing signals to a user regarding the operating status of said electronic interface control system; and, a carrying case, said carrying case including a foam insert, a torque wrench, and a safety strut, said foam insert having a switch beneath said torque wrench and a switch beneath said safety strut, said torque wrench switch and said safety strut switch being in operative communication with said computer, further comprising: four jacks, each jack adapted to locate proximate a wheel of an automobile; said plurality of indicators including a lug wrench indicator, safety strut indicator, excessive tilt indicator, flashers indicator, parking brake indicator, air pressure indicator, trunk open indicator, a system start indicator, a left front switch indicator, a right front switch indicator, a left rear switch indicator, and a right rear switch indicator, said switch indicators regulate said jacks with a left front indicator, a right front indicator, a left rear indicator, and a right rear indicator respectively, wherein said lug wrench indicator and said safety strut indicator cooperate with said carrying case; wherein said excessive tilt indicator, said system start indicator, and said air pressure indicator cooperate with said computer; wherein said flashers indicator and said trunk open indicator are adapted to cooperate with said automobile; wherein said left front switch indicator, said right front switch indicator, said left rear switch indicator, and said right rear switch indicator, said left front indicator, said right front indicator, said left rear indicator, and said right rear indicator operatively cooperate with said control panel, further comprising: said foam insert having a pocket for said torque wrench and a pocket for said safety strut, said torque wrench switch being positioned in said torque wrench pocket and said safety strut switch being positioned in said safety strut pocket, said torque wrench switch and said safety strut switch being biased open, wherein said torque wrench switch and said safety strut switch each open a circuit in the absence of said torque wrench and said safety strut respectively.

2. A method of operating an electronic interface control system for a pneumatic vehicle safety lift system upon an automotive vehicle, the method comprising: providing a computer adapted to receive power from the vehicle; providing a pneumatic system of a compressor and a plurality of hoses under control of said computer; providing four jacks operatively connected to said pneumatic system and adapted to mount upon the vehicle; deploying a plurality of indicators in communication with said computer, with said jacks, said plurality of indicators is adapted to communicate with sensors from the vehicle, and said plurality of indicators signaling to a user regarding the operation status of said method; and, providing a carrying case including a foam insert, a torque wrench, and a safety strut, providing said foam insert with a switch beneath said torque wrench and a switch beneath said safety strut, and maintaining said torque wrench switch and said safety strut switch in operative communication with said computer, said deploying a plurality of indicators including a lug wrench indicator, a safety strut indicator, an excessive tilt indicator, a flashers indicator, a parking brake indicator, an air pressure indicator, a trunk open indicator, a system start indicator, a left front switch indicator, a right front switch indicator, a left rear switch indicator, and a right rear switch indicator, said switch indicators regulate said jacks with a left front indicator, a right front indicator, a left rear indicator, and a right rear indicator respectively; wherein each of said indicators displays a visual signal or an audible signal to a user; wherein said lug wrench indicator, said safety strut indicator cooperate with said carrying case; wherein said excessive tilt indicator, said system start indicator, said air pressure indicator cooperate with said computer; wherein said flashers indicator and said trunk open indicator are adapted to cooperate with said vehicle; wherein said left front switch indicator, said right front switch indicator, said left rear switch indicator, and said right rear switch indicator, said left front indicator, said right front indicator, said left rear indicator, and said right rear indicator operatively cooperate with said control panel, said providing a carrying case including said foam insert having a pocket for said torque wrench and a pocket for said safety strut, positioning said torque wrench switch in said torque wrench pocket and said safety strut switch in said safety strut pocket, said torque wrench switch and said safety strut switch being biased open, wherein said torque wrench switch and said safety strut switch each complete a circuit in the absence of said torque wrench and said safety strut respectively; said providing a carrying case including said safety strut having a two hingedly connected leaves, said leaves forming a hollow cylinder when closed and a lock having an open position away from said leaves and a closed position upon said leaves; said safety strut being placed upon a jack during usage of said electronic interface control system with said leaves enwrapping a piston of said jack and said lock being in a closed position upon said leaves.

3. An electronic interface control system for a pneumatic vehicle safety lift system having a computer adapted to receive power from an automotive vehicle, a pneumatic system including a compressor and a plurality of hoses, said computer controlling said pneumatic system, four jacks operatively connected to said pneumatic system for extension and retraction and mounted upon the vehicle, wherein the improvement comprises a plurality of indicators in communication with said computer and said jacks, said plurality of indicators is adapted to communicate with sensors from an automotive vehicle, and said plurality of indicators providing signals to a user regarding the operation status of said electronic interface control system;

a carrying case, said carrying case including a foam insert, a torque wrench, and a safety strut, said foam insert having a switch beneath said torque wrench and a switch beneath said safety strut, said torque wrench switch and said safety strut switch being in operative communication with said computer;

said plurality of indicators including a lug wrench indicator, safety strut indicator, excessive tilt indicator, flashers indicator, parking brake indicator, air pressure indicator, trunk open indicator, a system start indicator, a left front switch indicator, a right front switch indicator, a left rear switch indicator, and a right rear switch indicator, said switch indicators regulate said jacks with a left front indicator, a right front indicator, a left rear indicator, and a right rear indicator respectively;

wherein said lug wrench indicator, said safety strut indicator cooperate with said carrying case; wherein said excessive tilt indicator, said system start indicator, said air pressure indicator cooperate with said computer; wherein said flashers indicator and said trunk open indicator are adapted to cooperate with said automobile; wherein said left front switch indicator, said right front switch indicator, said left rear switch indicator, and said right rear switch indicator, said left front indicator, said right front indicator, said left rear indicator, and said right rear indicator operatively cooperate with said control panel;

said foam insert having a pocket for said torque wrench and a pocket for said safety strut, said torque wrench switch being positioned in said torque wrench pocket and said safety strut switch being positioned in said safety strut pocket, said torque wrench switch and said safety strut switch being biased open, wherein said torque wrench switch and said safety strut switch each complete a circuit in the absence of said torque wrench and said safety strut respectively.

* * * * *